(12) United States Patent
You et al.

(10) Patent No.: US 8,264,452 B2
(45) Date of Patent: Sep. 11, 2012

(54) DISPLAY DEVICE, DISPLAY METHOD, AND ELECTRONIC DEVICE

(75) Inventors: Eiho You, Kanagawa (JP); Susumu Kimura, Tokyo (JP); Hiromasa Suzuki, Tokyo (JP); Masaru Higuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 12/503,462

(22) Filed: Jul. 15, 2009

(65) Prior Publication Data

US 2010/0020007 A1 Jan. 28, 2010

(30) Foreign Application Priority Data

Jul. 25, 2008 (JP) ................................. 2008-192330

(51) Int. Cl.
*G09G 3/36* (2006.01)

(52) U.S. Cl. ............................ 345/102; 345/690; 349/71

(58) Field of Classification Search ............ 345/76–102, 345/87–102, 690, 204

See application file for complete search history.

(56) References Cited

U.S. PATENT DOCUMENTS

2006/0232545 A1* 10/2006 Sekiguchi ...................... 345/102
2006/0244712 A1* 11/2006 Cho et al. ....................... 345/102

FOREIGN PATENT DOCUMENTS

JP 2006-301043 A 2/2006
JP 2007-286359 11/2007

OTHER PUBLICATIONS

Japanese Patent Office, Office Action issued in Patent Application JP 2008-192330, on May 11, 2010.

* cited by examiner

*Primary Examiner* — Duc Dinh
(74) *Attorney, Agent, or Firm* — SNR Denton US LLP

(57) ABSTRACT

There is provided a display device, including a display panel; a first light emitting unit for inputting a first input light to the display panel based on a first light emitting signal; a second light emitting unit for inputting second input light to the display panel based on a second light emitting signal; and light emitting control unit for outputting the first light emitting signal, the second light emitting signal, the image signal corresponding to the first input light, and the image signal corresponding to the second input light; where the light emitting control unit performs output of the first light emitting signal and the image signal of the color corresponding to the first input light in synchronization in a first sub-frame, and performs output of the second light emitting signal and the image signal of the color corresponding to the second input light in synchronization in a second sub-frame.

5 Claims, 14 Drawing Sheets

FIG.8A
LIGHT SOURCE          COLOR FILTER
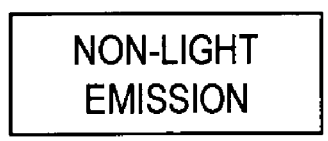    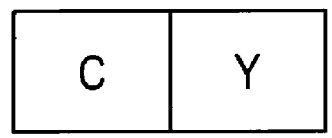
FIG.8B
LIGHT SOURCE          LIGHT TRANSMITTING
                      THROUGH COLOR FILTER
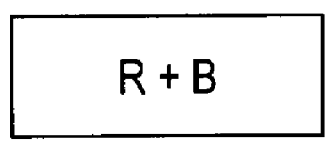    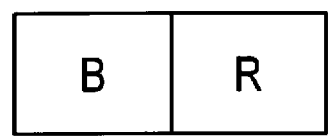
FIG.8C
LIGHT SOURCE          LIGHT TRANSMITTING
                      THROUGH COLOR FILTER
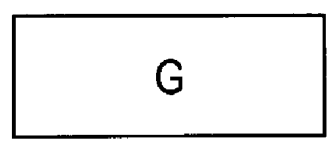    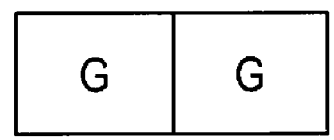

DISPLAY DEVICE, DISPLAY METHOD, AND ELECTRONIC DEVICE

BACKGROUND OF THE INVENTION

1. Field of the Invention

The present invention relates to a display device, a display method, and an electronic device.

2. Description of the Related Art

In recent years, various display devices such as organic EL display (Organic Electro Luminescence display; or also referred to as OLED display (Organic Light Emitting Diode display)), FED (Field Emission Display), LCD (Liquid Crystal Display), and PDP (Plasma Display Panel) are developed as a display device taking the place of a CRT display (Cathode Ray Tube display). Among such display devices, the liquid crystal display can be driven at low power consumption, and lower cost is advancing with maturity in production technique, and thus is being widespread used in an accelerating pace as a display device of the next generation taking the place of the CRT display.

The liquid crystal display is a non-self emitting display device equipped with a liquid crystal panel with a liquid crystal shutter, a light source (e.g., backlight), and a polarization plate for inputting the light emitted by the light source to the liquid crystal panel. The light source arranged in the liquid crystal display may be a CCFL (Cold Cathode Fluorescent Lamp), an LED (Light Emitting Diode), or the like. Since the cold cathode fluorescent lamp has a configuration in which mercury is enclosed in a fluorescent tube, it may adversely affect the environment and also needs high voltage to emit light. Therefore, the light emitting diode is often used for the light source in the recent liquid crystal display.

Furthermore, as a blue light emitting diode that emits blue light is being put to practical use, a light source using light emitting diodes that emit light of the three primary colors of red, green, and blue (red light emitting diode/green light emitting diode/blue light emitting diode) is used in the liquid crystal display. The liquid crystal display can emit a true white light by using the red light emitting diode, the green light emitting diode, and the blue light emitting diode for the light source. However, each light emitting diode has difference in the manner of degradation, the light emitting characteristics due to operation temperature, and the like depending on the difference in material and the like. Therefore, in the liquid crystal display using the red light emitting diode, the green light emitting diode, and the blue light emitting diode as the light source, the light emission control (color control) is carried out by detecting the light emitted from the light source, and feeding back the detection result.

A technique that further simplifies the feedback system for the light emission control in the non-light emitting display device having a separate light source has been developed. The technique for performing the light emission control by feedback of one system in the non-light emitting display device having a separate light source is disclosed in, for example, Japanese Patent Application Laid-Open No. 2007-286359.

SUMMARY OF THE INVENTION

A display device of the related art (hereinafter sometimes simply referred to as "display device of related art") applied with the technique of the related art that further simplifies the feedback for the light emission control in the non-light emitting display device having a separate light source (hereinafter sometimes simply referred to as "non-light emitting display device") only includes a feedback loop of one system. Thus, in the display device of the related art, the cost necessary for the feedback loop can be further saved. However, since the display device of the related art still requires the feedback system for the light emission control, increase in cost due to the arrangement of such feedback system is inevitable.

The non-light emitting display device such as the liquid crystal display is often applied to portable devices (so-called mobile device) including portable telephones, image/music reproduction devices such as WALK MAN (registered trademark), and portable game machines such as PlayStation Portable (registered trademark). Further miniaturization and lighter weight are desired for such devices. However, since the display device of the related art requires the feedback system for light emission control, circuits and the like that configure the feedback system are obviously desired. That is, in the display device of the related art, a space for installing the circuits and the like that configure the feedback system is necessary, and increase in weight due to such circuits and the like is inevitable. Therefore, if the display device of the related art is applied to the portable device such as the above, further miniaturization and lighter weight may not be desired.

Furthermore, the technique of the related art that further simplifies the feedback for light emission control in the non-light emitting display device merely achieves simplification of the feedback for light emission control and does not take into consideration higher image quality of the displayed image (still image/moving image). Therefore, higher image quality of the displayed image (still image/moving image) is not expected in the display device of the related art applied with the technique of the related art.

The present invention addresses the above-identified, and other issues associated with conventional methods and apparatuses, and it is desirable to provide a new and improved display device that eliminates the feedback system for light emission control in the non-light emitting display device having a separate light source and that achieves higher image quality, a display method, and an electronic device.

According to an embodiment of the present invention, there is provided a display device including: a display panel including a first color filter for transmitting light of two colors of light of three primary colors of red, green and blue, and a second color filter for transmitting light of two colors of the light of the three primary colors, the transmitting color being different from the color transmitted through the first color filter, for every pixel, the display panel displaying an image corresponding to a first image signal corresponding to a first color of the three primary colors, a second image signal corresponding to a second color of the three primary colors, and a third image signal corresponding to a third color of the three primary colors; a first light emitting unit, including a green light emitting diode that emits green light or a blue light emitting diode that emits blue light as a light source, for inputting light of at least one color of the light of the three primary colors as a first input light to the display panel based on a transmitted first light emitting signal; a second light emitting unit, including a green light emitting diode or a blue light emitting diode as a light source, for inputting light of a color other than the first input light of the light of the three primary colors as a second input light to the display panel based on a transmitted second light emitting signal; and a light emitting control unit for selectively outputting the first light emitting signal for the first light emitting unit to emit light, the second light emitting signal for the second light emitting unit to emit light, an image signal of a color corresponding to the first input light of the input first image signal, second image signal and third image signal, and an image signal of a color corresponding to the second input light;

wherein the light emitting control unit divides one frame period to a first sub-frame and a second sub-frame; output of the first light emitting signal to the first light emitting unit and output of the image signal of the color corresponding to the first input light to the display panel are performed in synchronization in the first sub-frame; and output of the second light emitting signal to the second light emitting unit and output of the image signal of the color corresponding to the second input light to the display panel are performed in synchronization in the second sub-frame.

According to such configuration, elimination of the feedback system for light emitting control and higher image quality are achieved in the non-light emitting display device having a separate light source.

Each of the first light emitting unit and the second light emitting unit may be configured by either the green light emitting diode or the blue light emitting diode and a red phosphor for outputting a red output light when light is input.

The first color filter and the second color filter may be configured by either a cyan filter for transmitting blue light and green light, or a yellow filter for transmitting red light and green light.

The display device may further include an image signal processing unit for generating the first image signal, the second image signal, and the third image signal based on the input image signal; wherein the light emitting control unit may input with the first image signal, the second image signal, and the third image signal generated by the image signal processing unit.

According to the embodiments of the present invention described above, there is provided a display method including the steps of: a first step of transmitting to a first light emitting unit a first light emitting signal for inputting light of at least one color of light of three primary colors of red, green, and blue as a first input light to a display panel for displaying an image corresponding to an input image signal in a first sub-frame of one frame period divided into the first sub-frame and a second sub-frame; a second step of transmitting an image signal of a color corresponding to the first input light to the display panel in synchronization with the transmission of the first light emitting signal in the first step; a third step of transmitting to a second light emitting unit a second light emitting signal for inputting light of a color other than the first input light of the light of the three primary colors as a second input light to the display panel in the second sub-frame; and a fourth step of transmitting an image signal of a color corresponding to the second input light to the display panel in synchronization with the transmission of the second light emitting signal in the third step; wherein the display panel includes a first color filter for transmitting light of two colors of the light of the three primary colors, and a second color filter for transmitting light of two colors of the light of the three primary colors, the transmitting color being different from the color transmitted through the first color filter, for every pixel; the first light emitting unit includes a green light emitting diode that emits green light or a blue light emitting diode that emits blue light as a light source, and inputs the first input light to the display panel based on the first light emitting signal transmitted in the first step; and the second light emitting unit includes a green light emitting diode or a blue light emitting diode as a light source, and inputs the second input light to the display panel based on the second light emitting signal transmitted in the third step.

Through the use of such method, elimination of the feedback system for light emitting control and higher image quality are achieved in the non-light emitting display device having a separate light source.

According to the embodiments of the present invention described above, there is provided an electronic device including: an image signal processing unit for generating a first image signal corresponding to a first color of three primary colors of red, green, and blue, a second image signal corresponding to a second color, and a third image signal corresponding to a third color based on an input image signal; and a display unit for displaying an image based on the first image signal, the second image signal, and the third image signal generated in the image signal processing unit; wherein the display unit includes, a display panel including a first color filter for transmitting light of two colors of light of the three primary colors, and a second color filter for transmitting light of two colors of the light of the three primary colors, the transmitting color being different from the color transmitted through the first color filter, for every pixel, the display panel displaying an image corresponding to the transmitted first image signal, the second image signal, and the third image signal; a first light emitting unit, including a green light emitting diode that emits green light or a blue light emitting diode that emits blue light as a light source, for inputting light of at least one color of the light of the three primary colors as a first input light to the display panel based on the transmitted first light emitting signal; a second light emitting unit, including a green light emitting diode or a blue light emitting diode as a light source, for inputting light of a color other than the first input light of the light of the three primary colors as a second input light to the display panel based on the transmitted second light emitting signal; and a light emitting control unit for selectively outputting the first light emitting signal for the first light emitting unit to emit light, the second light emitting signal for the second light emitting unit to emit light, an image signal of a color corresponding to the first input light of the input first image signal, the second image signal, and the third image signal generated by the image signal processing unit, and an image signal of a color corresponding to the second input light; wherein the light emitting control unit divides one frame period to a first sub-frame and a second sub-frame; output of the first light emitting signal to the first light emitting unit and output of the image signal of the color corresponding to the first input light to the display panel are performed in synchronization in the first sub-frame; and output of the second light emitting signal to the second light emitting unit and output of the image signal of the color corresponding to the second input light to the display panel are performed in synchronization in the second sub-frame.

According to such configuration, elimination of the feedback system for light emitting control and higher image quality are achieved in the non-light emitting display device having a separate light source.

According to the embodiments of the present invention described above, elimination of the feedback system for light emitting control and higher image quality are achieved in the non-light emitting display device having a separate light source.

BRIEF DESCRIPTION OF THE DRAWINGS

FIG. 8A is an explanatory view showing one example of a configuration of the color filter according to the embodiment of the present invention;

FIG. 8B is an explanatory view showing one example of a configuration of the color filter according to the embodiment of the present invention;

FIG. 8C is an explanatory view showing one example of a configuration of the color filter according to the embodiment of the present invention;

DETAILED DESCRIPTION OF THE PREFERRED EMBODIMENTS

Figure 1:
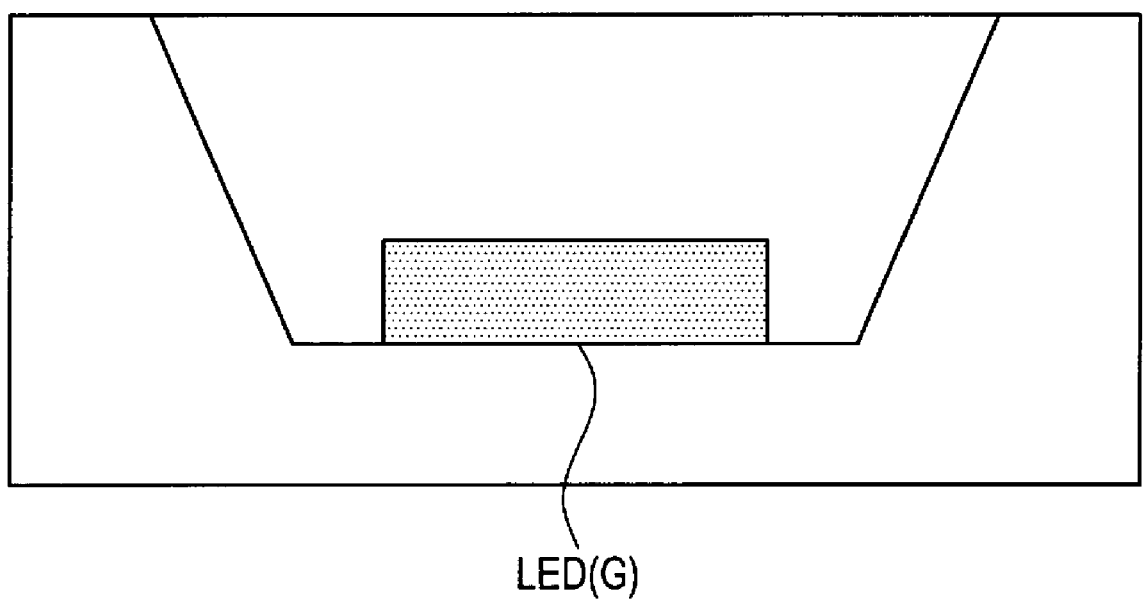
FIG. 1 is an explanatory view describing a configuration example of a first light source (first light emitting unit) and a second light source (second light emitting unit) according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

The liquid crystal display will be described below by way of example as the display device according to the embodiment of the present invention, but the display device according to the embodiment of the present invention is not limited thereto. For instance, the display device according to the embodiment of the present invention may be applied to a non-light emitting display device having a separate light source such as a DMD (Digital Micromirror Device). The description will be made below assuming that the display device according to the embodiment of the present invention displays the image corresponding to the input image signal, but the image according to the embodiment of the present invention may be a moving image or may be a still image. Furthermore, the image signal input to the display device according to the embodiment of the present invention may be a digital signal used in digital broadcast and the like, or may be an analog signal used in analog broadcast and the like.

The description will be made below in the following order.
1. Approach according to the embodiment of the present invention
2. Display device according to the embodiment of the present invention
3. Display method according to the embodiment of the present invention

Approach According to the Embodiment of the Present Invention

First, the approach for achieving elimination of the feedback system for light emission control in a display device (hereinafter sometimes referred to as "display device 100) according to the embodiment of the present invention and higher image quality will be described.

The display device 100 according to the embodiment of the present invention achieves elimination of the feedback system for light emission control and higher image quality by making the approach from two standpoints, (1) light source and (2) display type.

(1) Approach Related to Light Source

The display device 100 includes a first light source (first light emitting unit) that emits light of at least one color of the light of the three primary colors of red (hereinafter referred to as "R"), green (hereinafter referred to as "G"), and blue (hereinafter referred to as "B") as a first input light, and a second light source (second light emitting unit) that emits light of colors other than the first input light of the light of the three primary colors of RGB as a second input light. The display device 100 configures either the first light source or the second light source with a green light emitting diode that emits G light, and configures the other light source with a blue light emitting diode that emits B light. The display device 100 also realizes R light by including a phosphor of R (hereinafter referred to as "phosphor (R)") that outputs the R light when light is input in either the first light source or the second light source. In the description below, the light emitting diode is sometimes referred to as LED, and the LED of each color of RGB is sometimes referred to as LED (R), LED (G), and LED (B).

[Configuration Example of First Light Source, Second Light Source]

Figure 2:
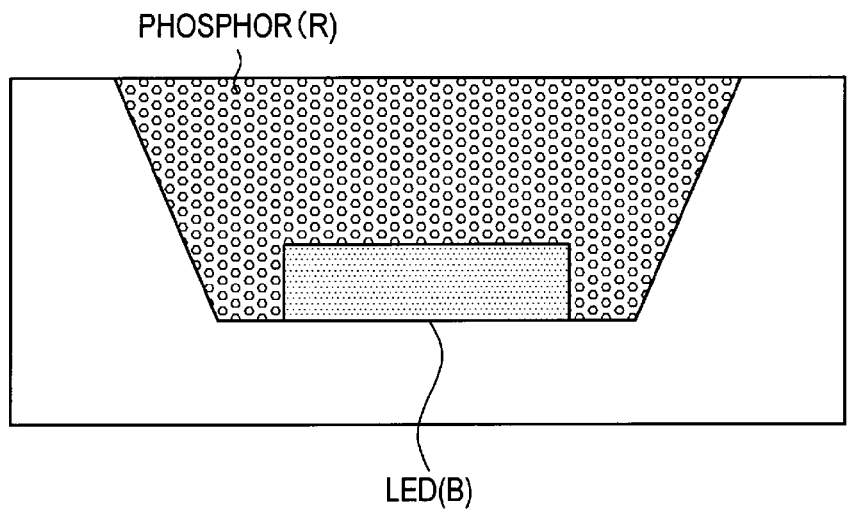
FIG. 2 is an explanatory view describing a configuration example of a first light source (first light emitting unit) and a second light source (second light emitting unit) according to an embodiment of the present invention.
Figure 3:
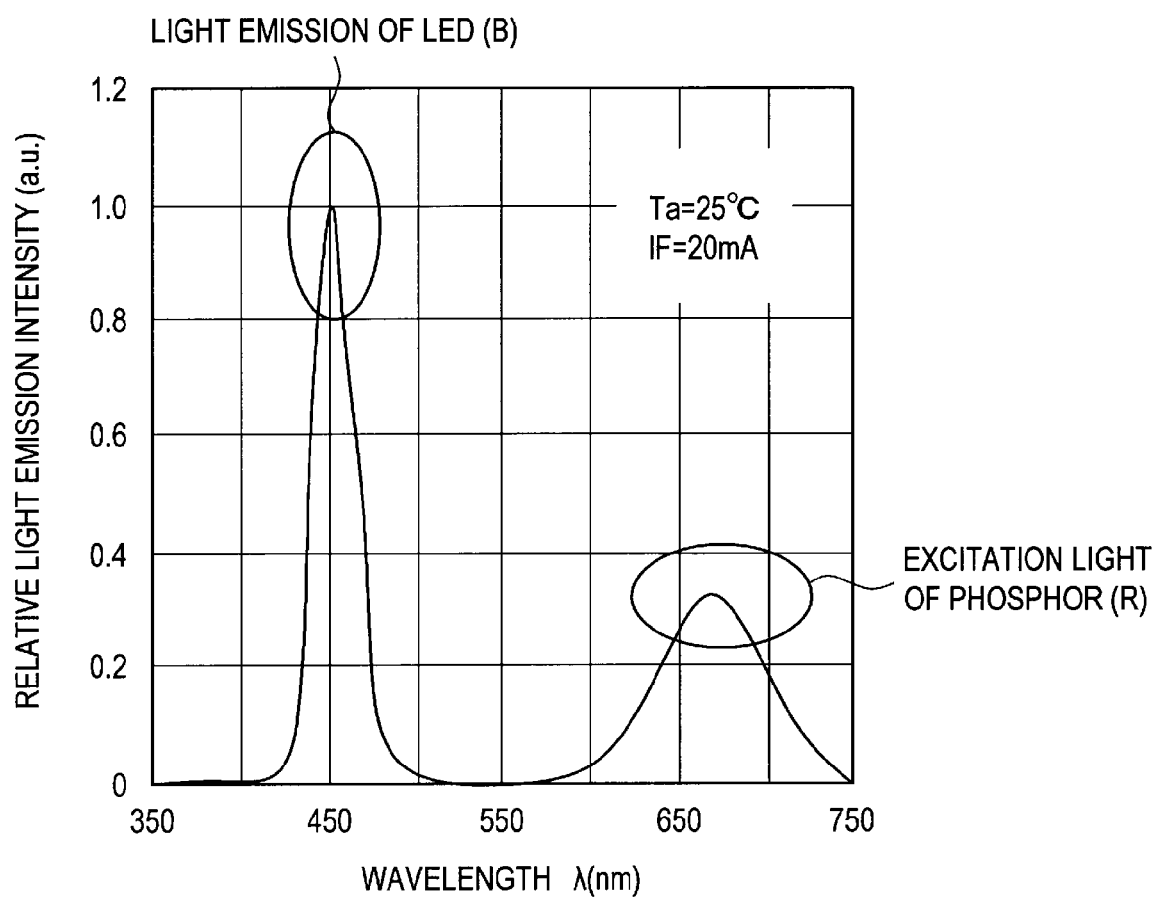
FIG. 3 is an explanatory view describing a configuration example of a first light source (first light emitting unit) and a second light source (second light emitting unit) according to an embodiment of the present invention.
Figure 4:
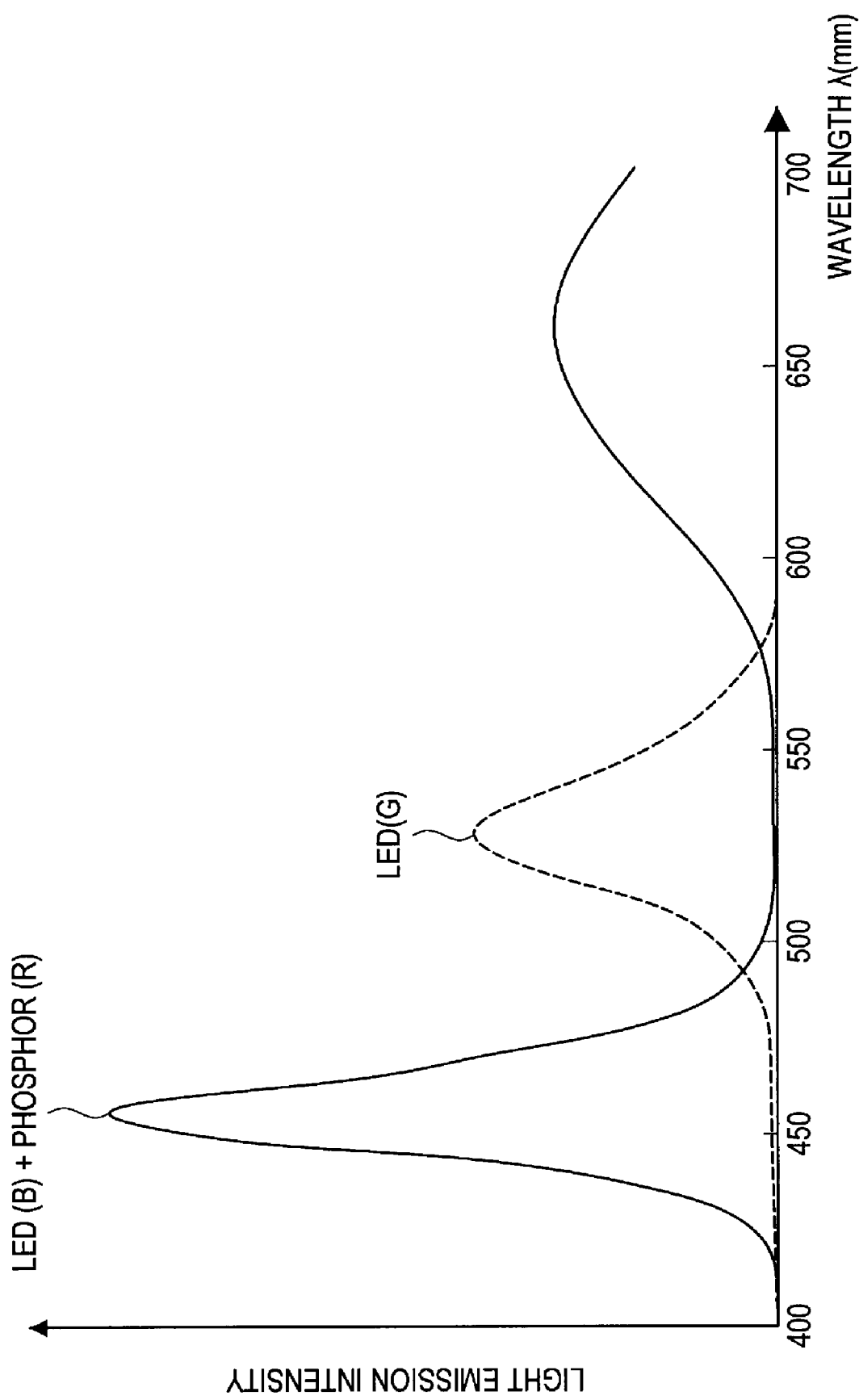
FIG. 4 is an explanatory view showing one example of a spectrum image of the first light source (first light emitting unit) and the second light source (second light emitting unit) according to the embodiment of the present invention.

FIGS. 1 to 3 are explanatory views describing a configuration example of the first light source (first light emitting unit) and the second light source (second light emitting unit) according to the embodiment of the present invention. FIGS. 1 and 2 respectively shows one example of a light source according to the embodiment of the present invention, where one is the first light source and the other is the second light source. FIG. 3 shows characteristics of the light emitted by the light source shown in FIG. 2. FIG. 4 is an explanatory view showing one example of a spectrum image of the first light source (first light emitting unit) and the second light source (second light emitting unit) according to the embodiment of the present invention. FIG. 4 shows one example of a spectrum image of when the display device 100 includes the light source shown in FIG. 1 and the light source shown in FIG. 2.

The light source shown in FIG. 1 includes the LED (G) and emits the G light ("LED (G)" shown in FIG. 4). The light source shown in FIG. 2 includes the LED (B) and a plurality of phosphors (R) and emits the B light from the light emission of the LED (B) and the R light output from the phosphor (R) ("LED (B)+phosphor (R)" shown in FIGS. 3 and 4).

The display device 100 achieves elimination of the feedback system for light emission control by including the first light source and the second light source having the configurations shown in FIGS. 1 and 2. The reasons therefor will be described below.

Figure 5A:
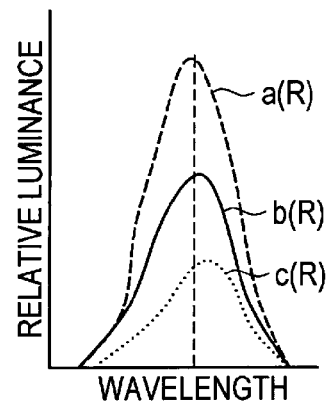
FIG. 5A is a first explanatory view describing the approach for achieving elimination of the feedback system for light emission control according to the embodiment of the present invention.
Figure 5B:
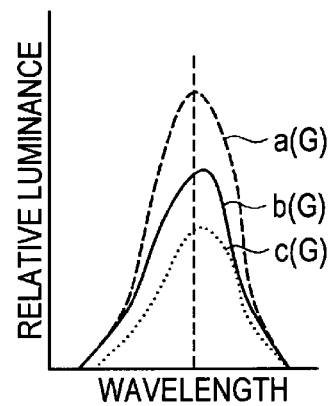
FIG. 5B is a first explanatory view describing the approach for achieving elimination of the feedback system for light emission control according to the embodiment of the present invention.
Figure 5C:
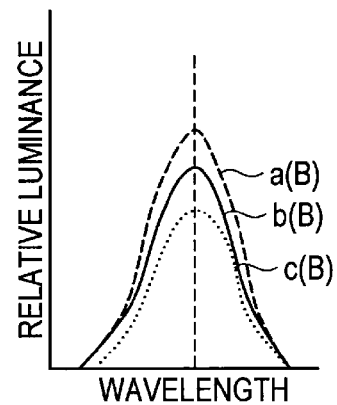
FIG. 5C is a first explanatory view describing the approach for achieving elimination of the feedback system for light emission control according to the embodiment of the present invention.

FIGS. 5A to 5C are first explanatory views describing the approach for achieving elimination of the feedback system for light emission control according to the embodiment of the present invention, and show one example of light emission characteristics by operation temperature in the LED of each color. FIG. 5A shows the light emission characteristics of the LED (R), FIG. 5B shows the light emission characteristics of the LED (G), and FIG. 5C shows the light emission characteristics of the LED (B). The letter a shown in FIGS. 5A to 5C indicates the light emission characteristics at −20 degrees Celsius, the letter b indicates the light emission characteristics at 25 degrees Celsius, and the letter c indicates the light emission characteristics at 85 degrees Celsius.

It can be seen with reference to FIGS. 5A to 5C that the LED (G) and the LED (B) have similar light emission characteristics.

Figure 6:
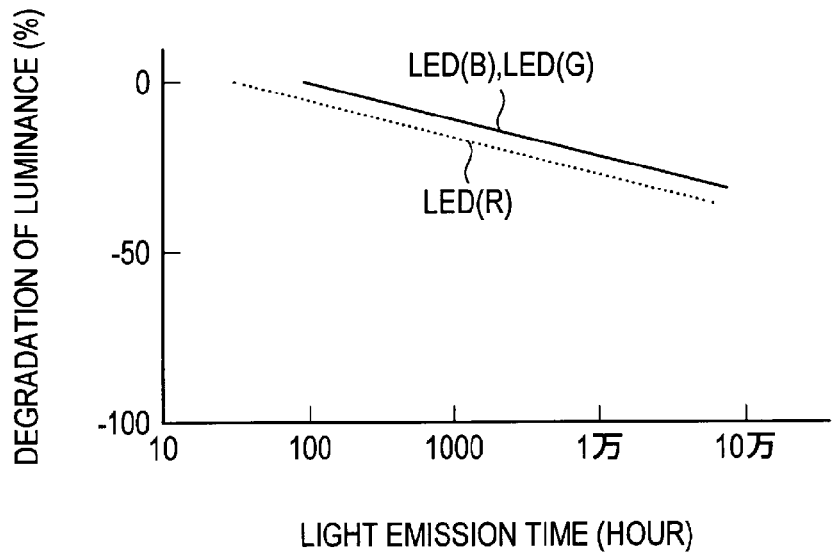
FIG. 6 is a second explanatory view describing the approach related to the light source for achieving elimination of the feedback system for light emission control according to the embodiment of the present invention.

FIG. 6 is a second explanatory view describing the approach related to the light source for achieving elimination of the feedback system for light emission control according to the embodiment of the present invention, and shows one example of time degradation of the LED of each color.

It can be seen with reference to FIG. 6 that the LED (G) and the LED (B) have similar time degradation speed.

As shown in FIGS. 5A to 5C and 6, the LED (G) and the LED (B) have similar light emission characteristics and time degradation speed. This is because the basic material configuring the LED (G) and the LED (B) is the material of the same series. On the contrary, the light emission characteristics and the time degradation speed of the LED (R) greatly differ from the LED (G) and the LED (B), as shown in FIGS. 5A to 5C and 6, as the basic material differs from the LED (G) and the LED (B). The embodiment of the present invention focuses on the characteristics of the above LEDs, and uses the LED (G) and the LED (B) having similar characteristics for the light source, as shown in FIGS. 1 and 2.

Figure 7:
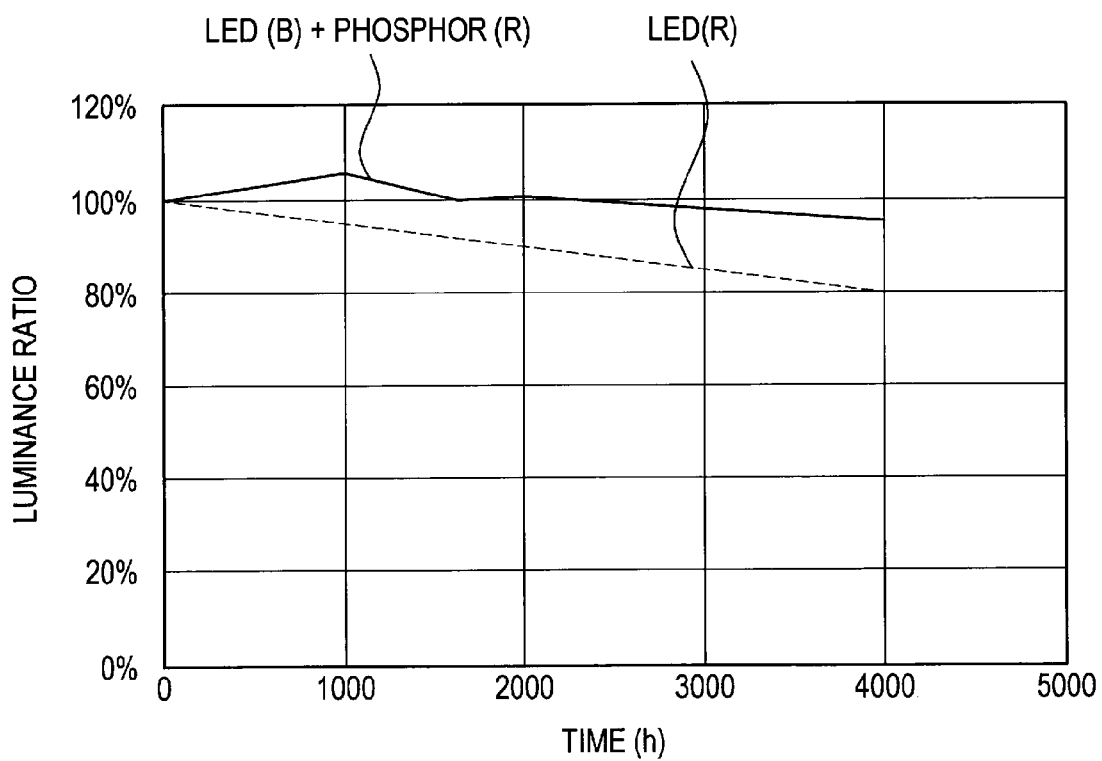
FIG. 7 is an explanatory view showing one example of time degradation in the light source having the configuration shown in FIG. 2, and the light source including the red light emitting diode.

FIG. 7 is an explanatory view showing one example of time degradation in the light source (LED (B)+phosphor (R)) having the configuration shown in FIG. 2, and the light source including the red light emitting diode (LED (R)). As shown in FIG. 7, it can be seen that the light source having the configuration shown in FIG. 2 has slower time degradation speed than the light source including the LED (R). Furthermore, although not shown in FIG. 7, the LED (G) and the LED (B) have similar time degradation speed, as shown in FIG. 6.

Therefore, the display device 100 can prevent off-balance of the light emitted by the light source that may occur from operation temperature and change over time by using the LED (G) and the LED (B) having similar characteristics for the light source, as shown in FIGS. 1 and 2. That is, in the display device 100, light emission control may not be performed by feedback as in the display device of the related art. Therefore, the display device 100 can achieve elimination of the feedback system for light emission control.

The configurations of the first light source and the second light source according to the embodiment of the present invention are not limited to the configurations of FIGS. 1 and 2. For instance, the first light source and the second light source according to the embodiment of the present invention may be configured by a light source including the LED (G) and a plurality of phosphors (R), and a light source including the LED (B). The description will be made below using a case where the display device 100 includes the light source shown in FIGS. 1 and 2 by way of example. As also shown in the configuration of the display device 100, to be hereinafter described, the first light source and the second light source according to the embodiment of the present invention may include the light source shown in FIG. 1 or FIG. 2 in plurals, respectively.

(2) Approach Related to Display Type

The approach related to the display type in the display device 100 according to the embodiment of the present invention will now be described. The approach related to the display type according to the embodiment of the present invention corresponds to the approach for achieving higher image quality in the display device 100.

The display method of a color image (moving image/still image) in a liquid crystal display, which is a non-light emitting display device, includes a color filter type and a field sequential type.

The color filter type is a type that displays a color image by arranging a color filter for transmitting light of a specific color for every pixel, and adjusting the proportion of light that transmits through each color filter. The color filter arranged in each pixel includes a color filter of three colors, a red color filter that transmits the R light, a green color filter that transmits the G light, and a blue color filter that transmits the B light. In the color filter type, the light emitted from the light source attenuates (attenuates to about ⅓) due to light absorption by each color filter of three colors of RGB. Therefore, the liquid crystal display using the color filter type has a demerit in that light emission efficiency lowers.

The field sequential type is a type that sequentially inputs light of each color of RGB from the light source to a display panel and displays the image of a corresponding color on the display panel in synchronization with the input of light of each color by the light source. The field sequential type is a type that performs color display by temporally mixing each color of RGB, and presents the image of each color of RGB as one image to the user by utilizing the afterimage effect of the user looking at the image. Here, the field sequential type does not use the color filter as with the color filter type, and thus lowering of the light emission efficiency does not occur. However, in order to realize the field sequential type while preventing lowering of image quality due to flickers, color breakup, and the like, the image of each color of RGB is to be switched in a predetermined frame period (e.g., one frame period). Thus, in the liquid crystal display using the field sequential type, a response speed of about three times that of the liquid crystal display using the color filter type becomes necessary. If the field frequency of the liquid crystal display using the color filter type is 60 MHz, the liquid crystal display using the field sequential type is to be operated at a frequency of greater than or equal to 180 MHz. Furthermore, higher frequency operation is demanded on the liquid crystal display using the field sequential type to enhance the moving image characteristics. As it is difficult at the present technical level to stably produce the liquid crystal display that operates at the frequency of greater than or equal to 180 MHz as described above, for example, it can be assumed that realizing the liquid crystal display using the field sequential type is difficult.

As described above, the display type of the color image in the non-light emitting display device includes the color filter type and the field sequential type. However, as it is difficult to realize the field sequential type, the color filter type is used in the non-light emitting display device.

In the display device 100 according to the embodiment of the present invention, two types of light sources, the first light source and the second light source, are arranged, as described in (1). The display device 100 achieves higher image quality by utilizing the arrangement of two types of light sources, and using both the color filter type and the field sequential type. The approach related to the display type will be more specifically described below.

(2-1) Color Filter Type According to Embodiment of the Present Invention

The display device 100 includes a first color filter for transmitting the light of two colors of the light of three primary colors of RGB and a second color filter for transmitting the light of two colors of the light of the three primary colors, the transmitting color being different from that of the first color filter, for every pixel.

FIGS. 8A to 8C are explanatory views showing one example of a configuration of the color filter according to the embodiment of the present invention. FIG. 8A shows a configuration of the color filter according to the embodiment of the present invention. FIGS. 8B and 8C show the relationship of the light emitted at the light source and the light that transmits through the color filter shown in FIG. 8A. In FIGS. 8A to 8C, the first light source and the second light source are expressed as one light source for the sake of convenience of the description.

[1] Case Where Light Source is Non-Light Emitting (FIG. 8A)

With reference to FIG. 8A, the color filter (first color filter/second color filter) according to the embodiment of the present invention includes, for example, a cyan filter (correspond to "C" in FIG. 8A) for transmitting the B light and the G light, and a yellow filter (correspond to "Y" in FIG. 8A) for transmitting the R light and the G light. Here, either the cyan filter or the yellow filter shown in FIG. 8A corresponds to the first color filter, and the other filter corresponds to the second color filter. The color filter according to the embodiment of the present invention is not limited to the above, and may be configured with a magenta filter.

Figure 9:
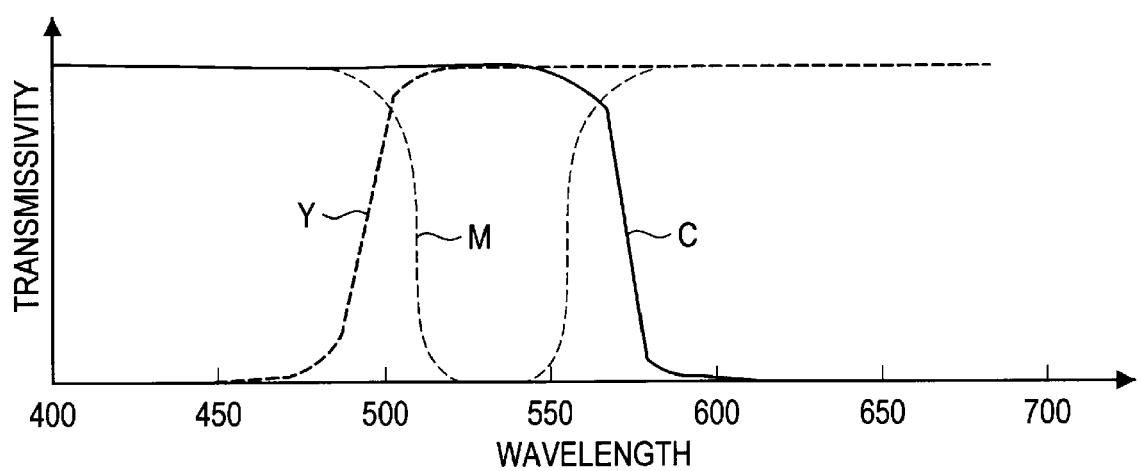
FIG. 9 is an explanatory view showing characteristics of the color filter according to the embodiment of the present invention.

FIG. 9 is an explanatory view showing characteristics of the color filter according to the embodiment of the present invention. The C shown in FIG. 9 shows the characteristics of the cyan filter, and the Y shows the characteristics of the yellow filter. The M shown in FIG. 9 shows the characteristics of the magenta filter. Here, the wavelength of the R light is between about 610 and 750 nm, the wavelength of the G light is between about 500 and 560 nm, and the wavelength of the B light is between about 435 and 480 nm. Therefore, as apparent from FIG. 9 as well, the cyan filter transmits the B light and the G light, the yellow filter transmits the R light and the G light, and the magenta filter transmits the B light and the R light.

[2] Case Where Light Source Emits the R Light and the B Light (FIG. 8B)

When the light source emits the R light and the B light, the cyan filter transmits the B light and the yellow filter transmits the R light. Thus, in the above case, the color filter according to the embodiment of the present invention can transmit both the B light and the R light emitted by the light source.

In the color filter according to the embodiment of the present invention, the light emitted from the light source attenuates by the light absorption of each color filter, similar to the color filter type of the related art. In the color filter type of the related art, the light emitted from the light source attenuates to about ⅓ (i.e., transmissivity is about 33%) by the light absorption of each color filter of three colors of RGB. The color filter according to the embodiment of the present invention, on the other hand, has a configuration including two color filters for transmitting the light of two colors of the light of the three primary colors of RGB, as shown in FIG. 8B. Thus, the attenuation of the light emitted from the light source by the light absorption of the color filter according to the embodiment of the present invention is suppressed to about ½ (i.e., transmissivity is about 50%). In other words, the display device 100 can enhance the transmissivity of the light emitted from the light source than the display device of the related art by arranging the color filter shown in FIG. 8A, and thus the image of higher luminance can be displayed. Thus, the display device 100 can achieve higher image quality.

[3] Case Where Light Source Emits the G Light (FIG. 8C)

When the light source emits the G light, the cyan filter transmits the G light and the yellow filter transmits the G light. Thus, in the above case, the color filter according to the embodiment of the present invention can transmit the G light emitted by the light source using both filters. That is, in the above case, the attenuation of light emitted from the light source by the light absorption of the color filter according to the embodiment of the present invention is prevented (i.e., transmissivity is 100%).

Therefore, the display device 100 can enhance the transmissivity of the light emitted from the light source than the display device of the related art by arranging the color filter shown in FIG. 8A, and thus the image of higher luminance can be displayed in the case of FIG. 8C as well. Thus, the display device 100 can achieve higher image quality.

Therefore, the display device 100 achieves higher image quality by including the color filter (first color filter/second color filter) having the configuration show in FIG. 8A. In the examples shown in FIGS. 8A to 8C, the display device 100 can have the transmissivity of the G light of 100%. The G light has high luminosity factor compared to the R light and the B light. Therefore, the display device 100 can further enhance the brightness felt by the user by setting the transmissivity of the G light large as shown in FIGS. 8A to 8C.

(2-2) Field Sequential Type According to Embodiment of Present Invention

The display device 100 transmits the light corresponding to the light emitted by the light source as shown in FIGS. 8B and 8C by arranging, for example, the light source (first light source/second light source) shown in FIGS. 1 and 2, and the color filter (first color filter/second color filter) having the configuration shown in FIG. 8A. The display device 100 displays on the display panel the image corresponding to the light transmitted from the color filter shown in FIGS. 8B and 8C by performing the following process.

The display device 100 divides one frame period into a first sub-frame and a second sub-frame, and emits the light source of either the first light source or the second light source in each sub-frame. The display device 100 selectively transmits to the display panel an image signal of a color corresponding to the first input light or an image signal of a color corresponding to the second input light in synchronization with the light emission of each light source, and displays the image corresponding to the image signal. The image signal of the color corresponding to the first input light and the image signal of the color corresponding to the second input light may be an image signal generated in an external device of the display device 100 or may be an image signal generated by the display device 100. Furthermore, the image signal of the color corresponding to the first input light and the image signal of the color corresponding to the second input light refer to the image signal indicating the image of R (sometimes referred to as "R signal" below), the image signal indicating the image of G (sometimes referred to as "G signal" below), and the image signal (sometimes referred to as "B signal" below) indicating the image of B.

Figure 10:
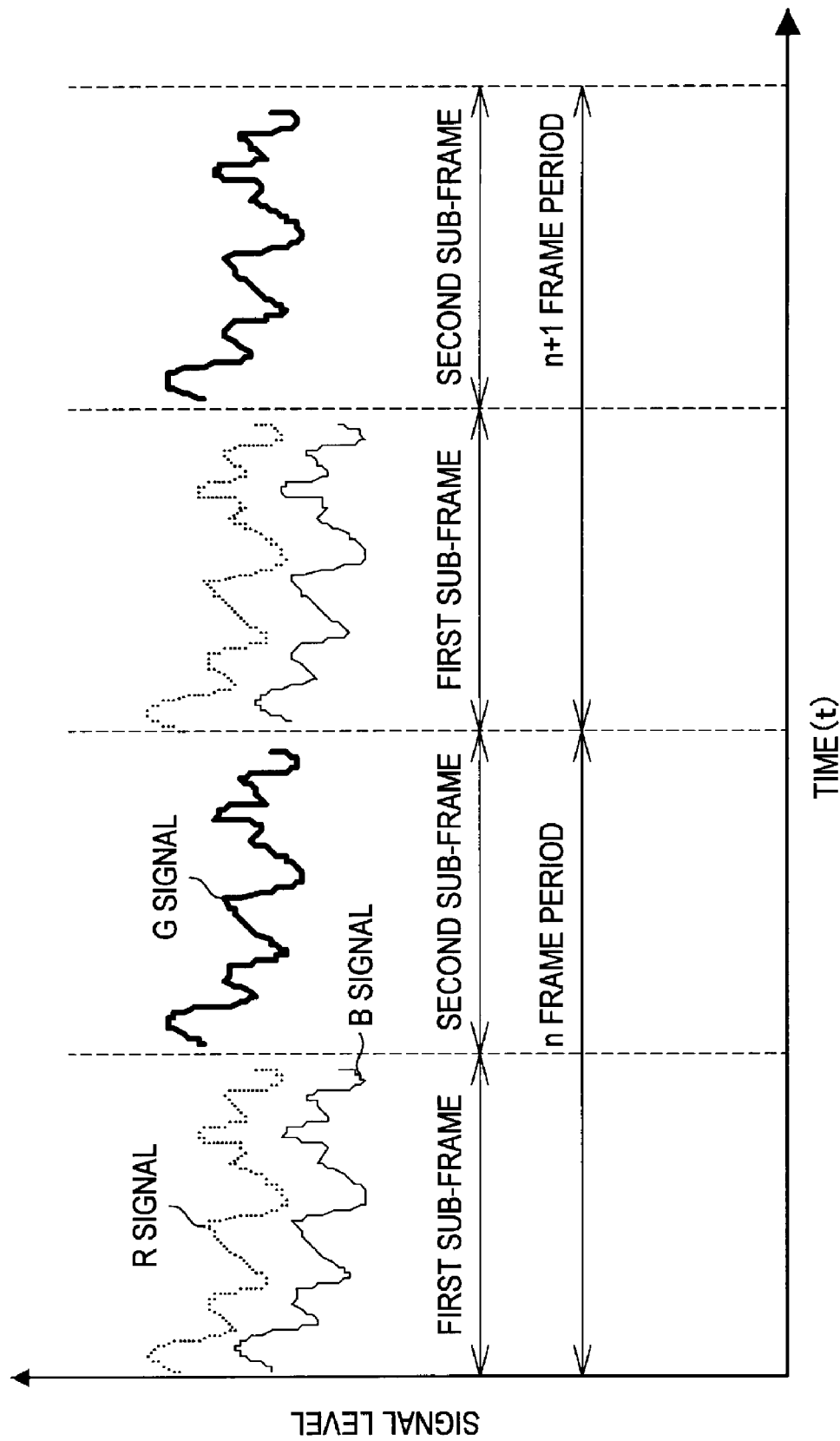
FIG. 10 is an explanatory view for describing the approach to achieve higher image quality according to the embodiment of the present invention.

FIG. 10 is an explanatory view for describing the approach to achieve higher image quality according to the embodiment of the present invention. For instance, when the first input light is the R light and the B light shown in FIG. 8B, the display device 100 transmits the image signal indicating the image of R and the image signal indicating the image of B to the display panel (first sub-frame shown in FIG. 10). When the second input light is the G light shown in FIG. 8C, the display device 100 transmits the image signal indicating the image of G to the display panel (second sub-frame shown in FIG. 10). Therefore, in the above case, the display device 100 displays the image of R and the image of B in the first sub-frame, and displays the image of G in the second sub-frame.

As shown in FIG. 10, in the field sequential type according to the embodiment of the present invention, one frame period is divided into two sub-frames, and the image of the color corresponding to the first input light or the image of the color corresponding to the second input light is displayed in synchronization with the light emission of the light source for every sub-frame. As described above, the field sequential type of the related art is a type that temporally mixes each color of RGB, and thus is to be operated at the field frequency of greater than or equal to 180 MHz. In the field sequential type according to the embodiment of the present invention, on the other hand, one frame period is divided into two sub-frames, and thus is merely to be operated at the field frequency of greater than or equal to 120 MHz. Therefore, the field sequential type according to the embodiment of the present invention can lower the field frequency to about ⅔ than the field sequential type of the related art, and thus can be more easily realized (more specifically, it can be sufficiently responded at the present technical level).

The display device 100 uses both the color filter type and the field sequential type, as shown in (2-1) and (2-2). The display device 100 thus can obtain the usage efficiency of the light emitted from the light source as described below. The result of the luminance analysis based on the transmissivity of the color filter and the display time is shown below. The usage efficiency of the light emitted from the light source in the display device of the related art using the color filter type of the related art is also shown below for comparison.

[Display Device of the Related Art]
Luminance of R: 33% (transmissivity)×100% (display time)=33%
Luminance of G: 33% (transmissivity)×100% (display time)=33%
Luminance of B: 33% (transmissivity)×100% (display time)=33%

[Display Device 100 According to Embodiment of the Present Invention]
Luminance of R: 50% (transmissivity)×50% (display time)=25%
Luminance of G: 100% (transmissivity)×100% (display time)=100%
Luminance of B: 50% (transmissivity)×50% (display time)=25%

As described above, the G light has high luminosity factor compared to the R light and the B light. Therefore, the brightness felt by the user can be further enhanced in the display device 100 than the display device using the color filter type of the related art by enhancing the luminance of G than the display device using the color filter type of the related art. Therefore, the display device 100 can achieve higher image quality than the display device using the color filter type of the related art.

The display device 100 can enhance the usage efficiency of the light as described below compared to the display device of the related art using the color filter type of the related art since the light emitted from the light source for every sub-frame can be used 100%.

R: 33% (display device of the related art)⇒50% (display device 100)
G: 33% (display device of the related art)⇒100% (display device 100)
B: 33% (display device of the related art)⇒50% (display device 100)

As described above, the display device 100 includes two types of light sources, the first light source and the second light source, and configures either the first light source or the second light source with the green light emitting diode that emits the G light and configures the other light source with the blue light emitting diode that emits the B light (approach of (1)). The display device 100 also displays the image corresponding to the input image signal on the display panel by using both the color filter type shown in (2-1) and the field sequential type shown in (2-2) (approach of (2)). Therefore, the display device 100 can achieve elimination of the feedback system for light emission control and higher image quality by using the approaches described above.

Display Device 100 According to Embodiment of the Present Invention

Figure 11:
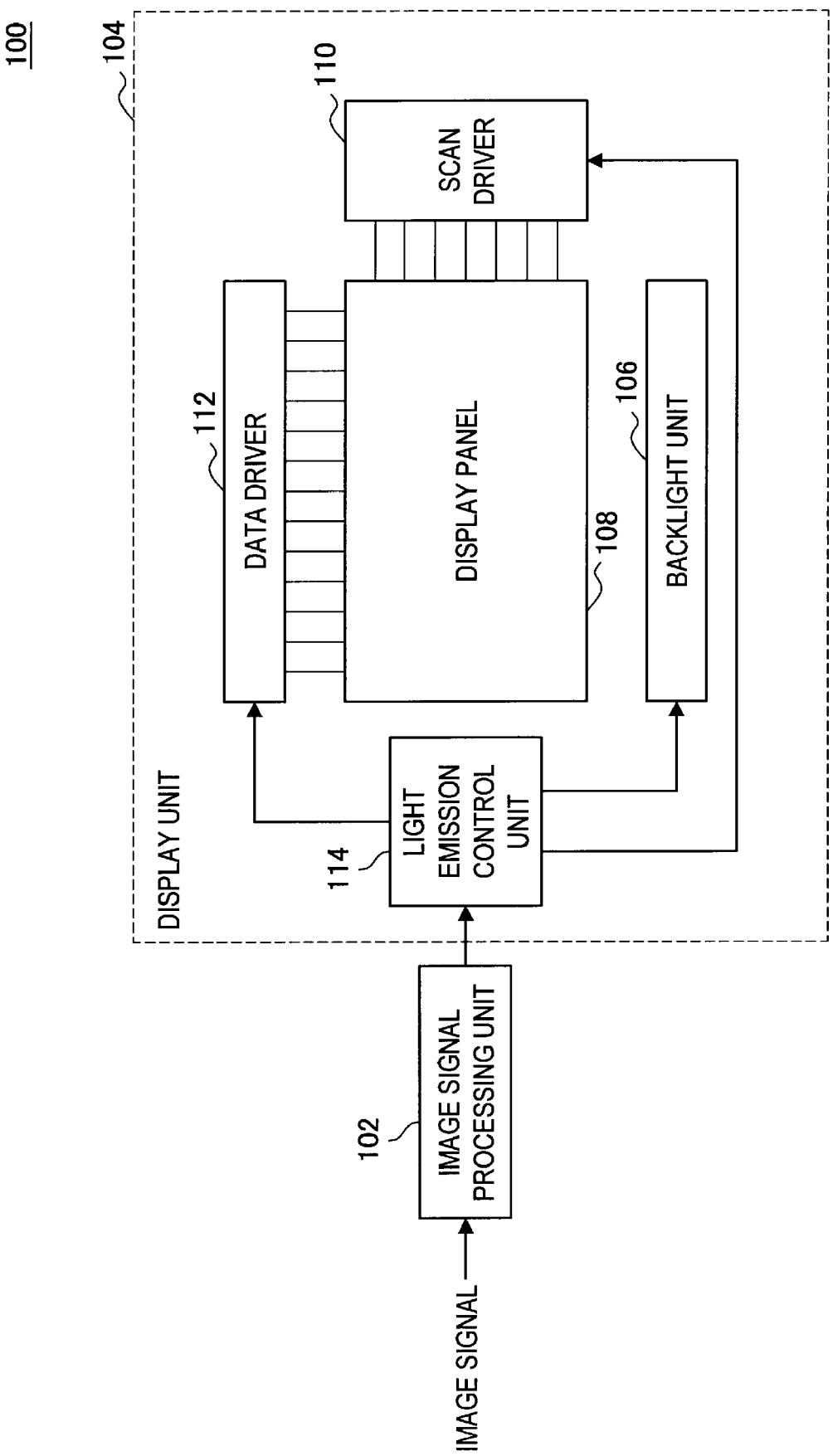
FIG. 11 is a block diagram showing one example of the configuration of a display device according to the embodiment of the present invention.

The configuration of the display device 100 according to the embodiment of the present invention capable of realizing the approaches of the embodiment of the present invention described above will now be described. FIG. 11 is a block diagram showing one example of the configuration of the display device 100 according to the embodiment of the present invention.

With reference to FIG. 11, the display device 100 includes an image signal processing unit 102, and a display unit 104. In FIG. 11, a configuration in which the display device 100 includes the image signal processing unit 102 is shown, but the configuration of the display device 100 according to the embodiment of the present invention is not limited to the above. For instance, the display device 100 may have a configuration of not including the image signal processing unit 102, that is, a configuration input with the image signal processed by an external device (e.g., image processing device) corresponding to the image signal processing unit 102. The display device 100 may also configure one electronic device with the image processing device described above (in this case, the configuration shown in FIG. 11 is the electronic device).

The display device 100 may also include a control unit (not shown), a ROM (Read Only Memory; not shown), a RAM (Random Access Memory; not shown), a storage unit (not shown), a communication unit (not shown), an operation unit (not shown) operable by the user, and the like. The display device 100 connects each configuring elements by a bus serving as a data transmission path. The display device 100 may also include a power supply for supplying a drive voltage for driving each configuring element, a reference voltage to apply to a common electrode (opposite electrode) of the display panel 108, and the like. It should be recognized that the display device 100 can obtain the drive voltage, and the like from an external power supply.

The control unit is configured by an MPU (Micro Processing Unit), and the like, and controls the entire display device 100. The ROM stores programs to be used by the control unit and the control data such as calculation parameter. The RAM primary stores the programs and the like to be executed by the control unit. The storage unit is storage means arranged in the display device 100, and stores various data such as video files, image files, and applications. The communication unit is communication means arranged in the display device 100 for performing wired/wireless communication with the external device.

Here, the storage unit (not shown) may be a magnetic recording medium such as hard disc, or a non-volatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory), but is not limited thereto. The communication unit may be a communication antenna and an RF circuit (wireless communication), IEEE 802.15.1 port and transmission/reception circuit (wireless communication), IEEE 802.11b port and transmission/reception circuit (wireless communication), or LAN terminal and transmission/reception circuit (wired communication), but is not limited thereto. The operation unit (not shown) may be an operation input device such as keyboard and mouse, button, direction key, rotatable selector such as jog dial, or a combination thereof, but is not limited thereto.

[Hardware Configuration Example of Display Device 100]

Figure 12:
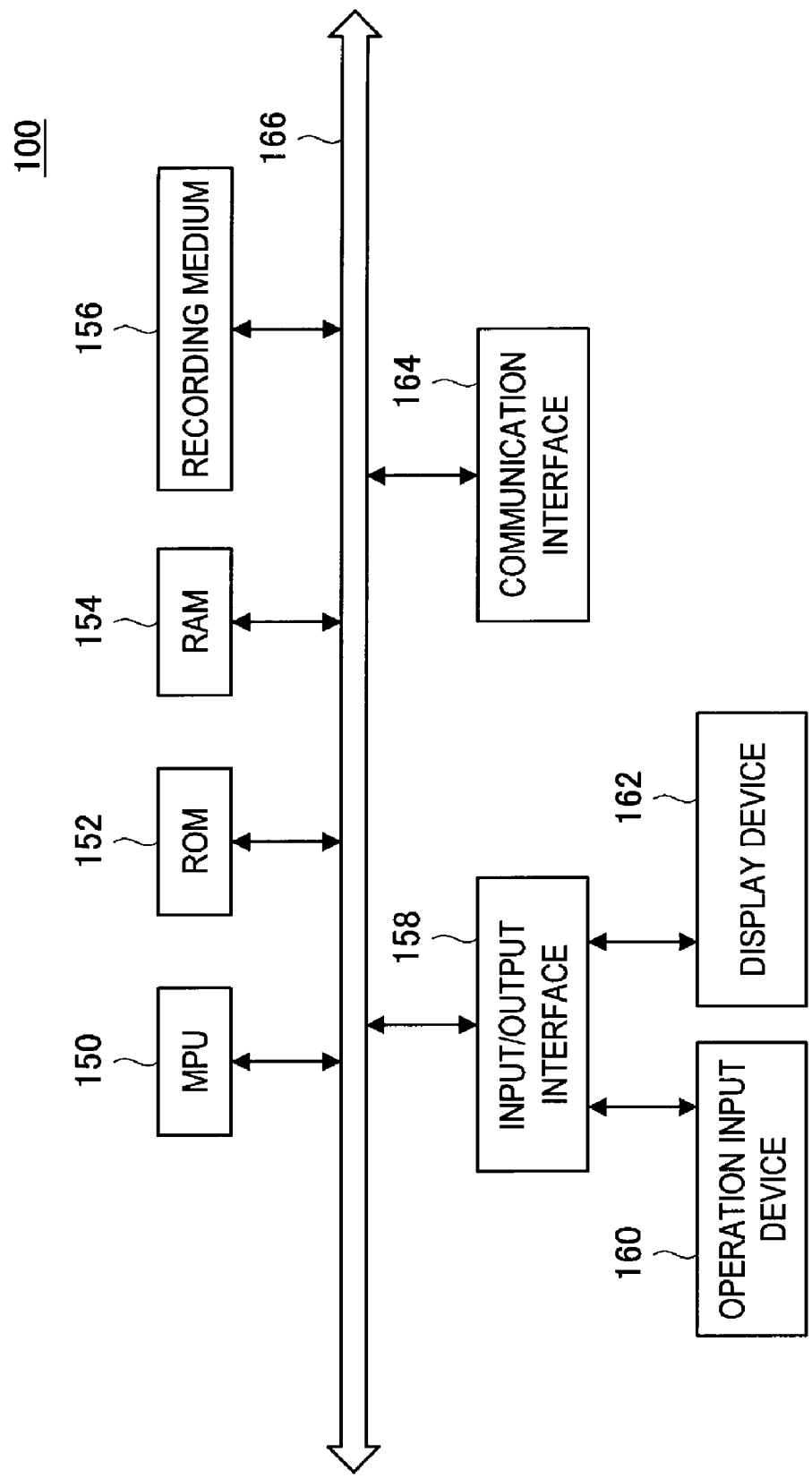
FIG. 12 is an explanatory view showing one example of a hardware configuration of the display device according to the embodiment of the present invention.

FIG. 12 is an explanatory view showing one example of a hardware configuration of the display device 100 according to the embodiment of the present invention. With reference to FIG. 12, the display device 100 includes an MPU 150, a ROM 152, a RAM 154, a recording medium 156, an input/output interface 158, an operation input device 160, a display device 162, and a communication interface 164. The display device 100 connects each configuring element with a bus 166 serving as a data transmission path.

The MPU 150 functions as a control unit for controlling the entire display device 100. The MPU 150 can also serve as the image signal processing unit 102 in the display device 100.

The ROM 152 stores the programs to be used by the MPU 150 and the control data such as the calculation parameter, and the RAM 154 primary stores the programs and the like to be executed by the MPU 150.

The recording medium 156 functions as the storage unit, and stores image files, applications and the like. The recording medium 156 may be a magnetic recording medium such as hard disc, or a non-volatile memory such as flash memory, but is not limited thereto.

The input/output interface 158 connects the operation input device 160 and the display device 162. The operation input device 160 functions as the operation unit, and the display deice 162 functions as the display unit 104.

The input/output interface 158 may be a USB (Universal Serial Bus) terminal, a DVI (Digital Visual Interface) terminal, an HDMI (High-Definition Multimedia Interface) terminal and the like, but is not limited thereto. The operation input device 160 is arranged on the display device 100, and is connected with the input/output interface 158 inside the display device 100. The operation input device 160 may be a button, direction key, rotatable selector such as jog dial, or a combination thereof, but is not limited thereto. The display device 162 is a non-light emitting display device such as LCD, and is arranged on the display device 100 and connected with the input/output interface 158 inside the display device 100. It should be recognized that the input/output interface 158 may be connected with the operation input device (e.g., keyboard, mouse, etc.) serving as the external device of the display device 100, and the display device (e.g., external display, etc.).

The communication interface 164 is communication means arranged in the display device 100, and functions as a communication unit for performing wired/wireless communication with the external device. The communication interface 164 may be a communication antenna and an RF circuit (wireless communication), a LAN terminal and a transmission/reception circuit (wired communication), and the like but is not limited thereto.

The display device 100 can realize the approach according to the embodiment of the present invention described above with the hardware configuration shown in FIG. 12.

The hardware configuration of the display device 100 according to the embodiment of the present invention is not limited to the above. For instance, the display device 100 according to the embodiment of the present invention may be a configuration including only the display device 162 shown in FIG. 12, that is, a configuration including the display unit 104 shown in FIG. 11, to be hereinafter described. In the above case, the display device 100 is used by being incorporated in various electronic devices as a display device.

With reference again to FIG. 11, the configuration of the display device 100 will now be described. The image signal processing unit 102 generates a first image signal corresponding to the first color of the three primary colors of the RGB, a second image signal corresponding to the second color, and a third image signal corresponding to the third color based on the input image signal. The following description is made with the first image signal as the image signal (R signal) indicating the image of R, the second image signal as the image signal (G signal) indicating the image of G, and the third image signal as the image signal (B signal) indicating the image of B, but it should be recognized that it is not limited thereto.

The MPU serving as the control unit arranged in the display device 100 may function as the image signal processing unit 102, but is not limited thereto. For instance, the image signal processing unit 102 may be realized with a dedicated signal processing circuit or a generally purpose signal processing circuit for generating the first image signal, the second image signal, and the third image signal. It should be recognized that the image signal processing unit 102 is not limited to hardware, and may be realized with software (signal processing software).

The display device 104 includes two types of light sources as shown in FIGS. 1 and 2, and a color filter as shown in FIG. 8A for every pixel. The following description is made with the light source shown in FIG. 2 (i.e., light source that emits the R light and the B light) as the first light source, and the light source shown in FIG. 1 (i.e., light source that emits light G) as the second light source. Furthermore, the following description is made using a case where the display device 100 includes the color filter shown in FIG. 8A (i.e., cyan filter and yellow filter) for every pixel by way of example. Therefore, each color filter transmits the B light and the R light (FIG. 8B) when the first light source emits light, and each color filter transmits the G light (FIG. 8C) when the second light source emits light.

Therefore, the display device 100 achieves elimination of the feedback system for light emission control by including the display unit 104 in which the first light source and the second light source are configured with the green light emitting diode and the blue light emitting diode.

Moreover, the display unit 104 divides one frame period into two sub-frames by selectively light emitting either the first light source or the second light source within one frame period. The display unit 104 displays the image corresponding to the image signal (first image signal, second image signal, and third image signal) transmitted from the image signal processing unit 102 for each sub-frame in synchronization with the selective light emission of the first light source or the second light source. More specifically, the display unit 104 displays the image corresponding to the first image signal (R signal) and ht third image signal (B signal) corresponding to the light emitted by the first light source when light emitting the first light source in the first sub-frame. The display unit 104 displays the image corresponding to the second image signal (G signal) corresponding to the light emitted by the second light source when light emitting the second light source in the second sub-frame.

Therefore, the display unit 104 can realize both the color filter type according to the embodiment of the present invention shown in (2-1) and the field sequential type according to the embodiment of the present invention shown in (2-2). The display device 100 thus realizes higher image quality by including the display unit 104.

[Configuration Example of Display Unit 104]

One example of a configuration of the display unit 104 according to the embodiment of the present invention will now be described. The display unit 104 includes a backlight unit 106, a display panel 108, a scan driver 110, a data driver 112, and a light emission control unit 114.

The backlight unit 106 includes the first light source and the second light source, and selectively inputs the light of each of RGB to the display panel 108 based on a first light emission signal and a second light emission signal transmitted from the light emission control unit 114, to be hereinafter described. The first light emission signal is a control signal for light emitting the first light source, and the second light emission signal is a control signal for light emitting the second light source.

In FIG. 11, the backlight unit 106 is shown at the lower part of the display panel 108, but this is for the sake of convenience. The backlight unit 106 according to the embodiment of the present invention is, for example, arranged on a rear surface of the display panel 108 (rear surface when seen from the side of the user looking at the image, hereinafter the same), and emits light towards the front surface of the display device 100 (refer to the side of the user looking at the image, hereinafter the same). The configuration example of the backlight unit 106 is shown along with the configuration of the display panel 108.

The display panel 108 includes a plurality of pixels arranged in a matrix form (rows and columns) and serves as a display screen on which the image is displayed. For instance, the panel displaying the image of SD (Standard Definition) resolution has at least 640×480=307200 (data line×scanning line) pixels, and has 640×480×3=921600 (data line×scanning line×number of sub-pixels) sub-pixels if the relevant pixel is made up of sub-pixels of R, G, and B for color display. Similarly, the panel displaying the image of HD (High Definition) resolution has 1920×1080 pixels, and has 1920×1080×3 sub-pixels in the case of color display.

The display panel 108 includes a pixel electrode (not shown) and a pixel circuit (not shown) for driving the pixel electrode for every pixel. The display panel 108 also includes an opposite electrode (so-called common electrode, not shown) on the opposing surface with a predetermined distance with each pixel electrode, where a liquid crystal layer is formed between the surface formed with the pixel and the surface arranged with the opposite electrode. The pixel circuit includes a switch element that is turned ON/OFF according to a scan signal transmitted from the scanning line, and applies a data signal corresponding to the image signal transmitted from the data line to the pixel electrode. As described above, the array of liquid crystals between the pixel electrode and the opposite electrode changes by the electric field corresponding to the data signal generated between the pixel electrode applied with the data signal and the opposite electrode when each pixel circuit selectively applies the data signal to the pixel electrode. The so-called liquid crystal shutter is realized in the display panel 108 by the above operation. The switch element may be a thin film transistor, but is not limited thereto.

The display unit 104 can display the image in an active matrix type by configuring the display panel 108 in the above manner. It should be recognized that the display unit 104 according to the embodiment of the present invention can display the image in the passive matrix type.

[Configuration Example of Backlight Unit 106, Display Panel 108]

Figure 13:
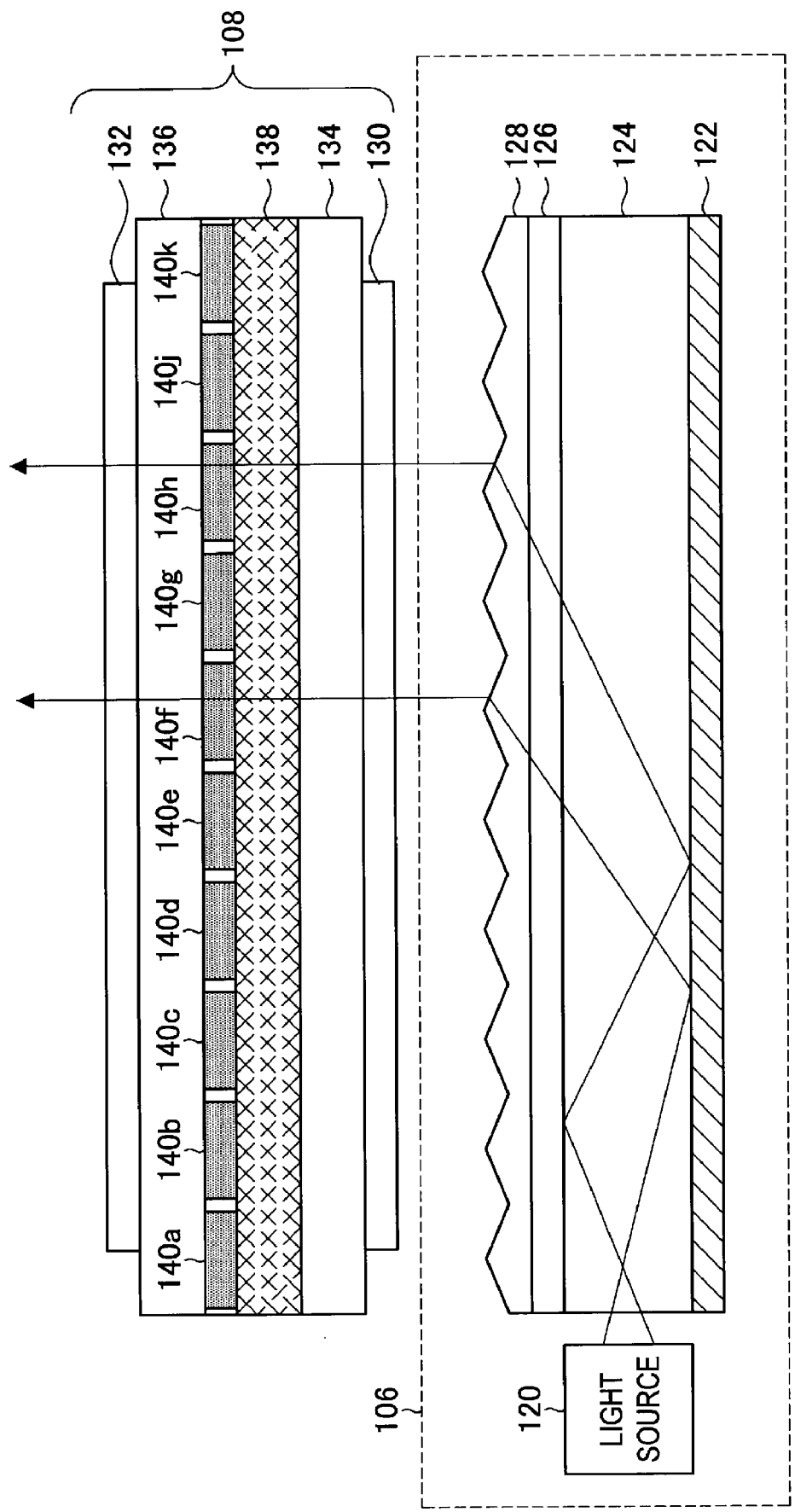
FIG. 13 is an explanatory view showing a configuration example of a backlight unit and a display panel according to the embodiment of the present invention.

FIG. 13 is an explanatory view showing a configuration example of the backlight unit 106 and the display panel 108 according to the embodiment of the present invention. FIG. 13 shows the backlight unit 106 and the display panel 108 in cross-sectional views. FIG. 13 shows each configuring element in an exaggerated manner for the sake of convenience of description.

[A] Configuration Example of Backlight Unit 106

With reference to FIG. 13, the backlight unit 106 includes a light source 120, a reflective sheet 122, a light guide plate 124, a diffusion sheet 126, and a prism sheet 128. The light emitted from the light source 120 is reflected and diffused in the light guide plate 124 by the reflective sheet 122 and the diffusion sheet 126, and input to the display panel 108 through the prism sheet 128. In FIG. 13, the reflection of the light emitted from the light source is shown for the sake of convenience of description, but diffusion of light is also carried out.

<Configuration Example of Light Source 120>

Figure 14:
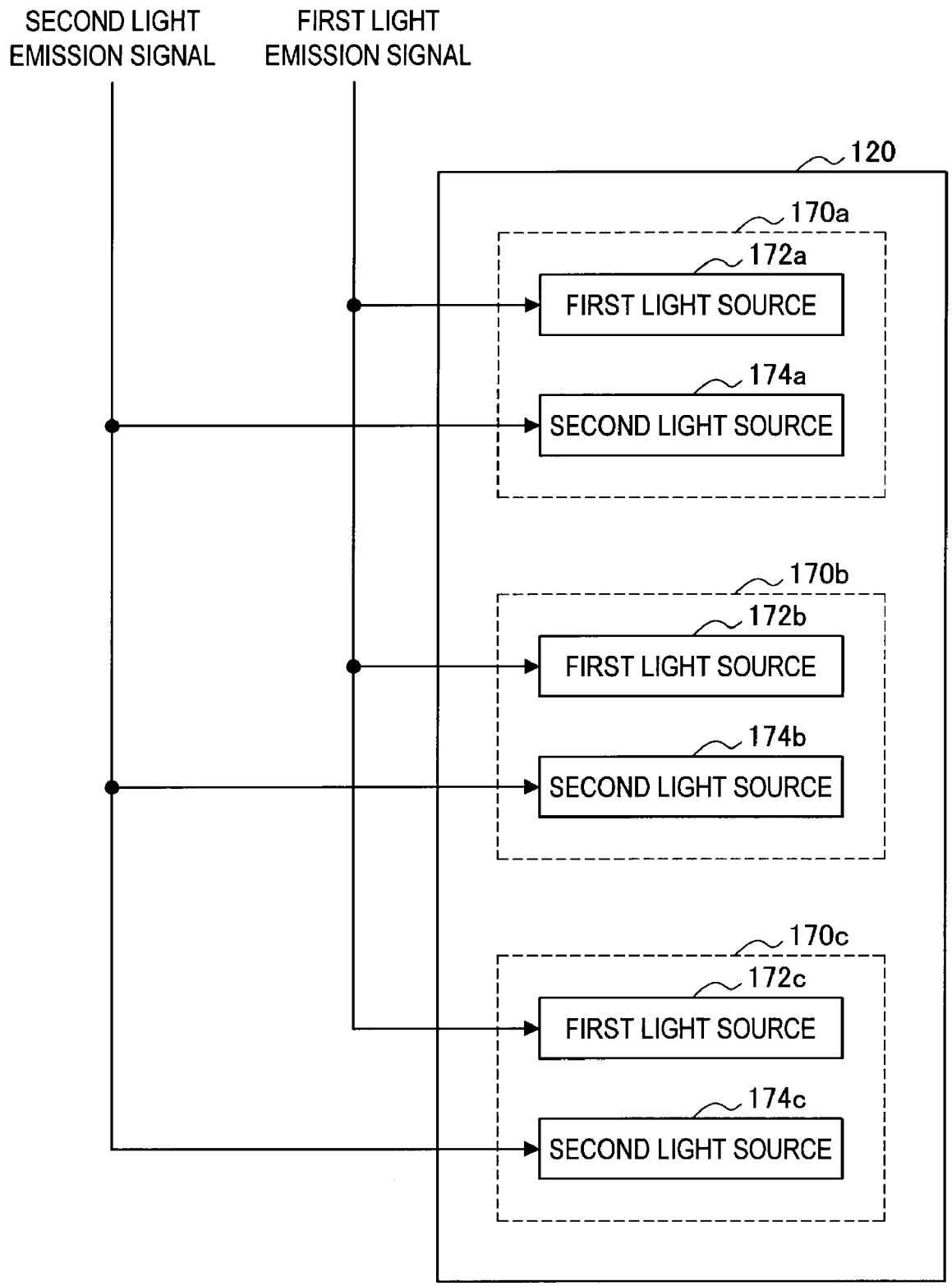
FIG. 14 is an explanatory view showing one example of a configuration of the light source according to the embodiment of the present invention.

FIG. 14 is an explanatory view showing one example of a configuration of the light source 120 according to the embodiment of the present invention. With reference to FIG. 14, the light source 120 includes one or more light source units 170. Each light source unit includes a first light source 172 and a second light source 174. In FIG. 14, three light source units 170a to 170c are shown, but it should be recognized that the light source unit according to the embodiment of the present invention is not limited to three. As described above, the following description is made with the first light sources 172a to 172c having the configuration of FIG. 2 (configuration that emits the R light and the B light), and the second light sources 174a to 174c having the configuration of FIG. 1 (configuration that emits the G light).

The first light emission signal and the second light emission signal are transmitted from the light emission control unit 114 to each light source unit, where the first light source emits light in response to the transmitted first light transmission signal and the second light source emits light in response to the transmitted second light emission signal. For instance, the first light source emits the R light and the B light if the transmitted first light emission signal is a signal of high level, and the first light source does not emit light if the first light emission signal of high level is not transmitted (e.g., when signal is signal of low level, or the signal is not transmitted). Similarly, the second light source emits the G light if the transmitted second light emission signal is a signal of high level, and the second light source does not emit light if the second light emission signal of high level is not transmitted (e.g., when signal is signal of low level, or the signal is not transmitted).

The display device 100 can divide one frame period into two sub-frames by having the light source 120 emit light in response to the first light emission signal and the second light emission signal transmitted from the light emission control unit 114. Furthermore, the light source 120 includes the first light source and the second light source configured by the green light emitting diode or the blue light emitting diode as shown in FIGS. 1 and 2, so that elimination of the feedback system for light emission control can be achieved.

[B] Configuration Example of Display Panel 108

The configuration example of the display panel 108 will be described with reference again to FIG. 13. The display panel 108 includes polarization plates 130, 132, first glass base 134, a second glass base 136, and a liquid crystal layer 138.

The first glass base 134 is a base made of glass arranged on the rear surface side of the display panel, where the first glass base 134 is formed with the scanning line, the data line, and the pixel circuit described above. The scanning line is connected with the scan driver 110, and the scan signal is transmitted to the scanning line from the scan driver 110. The data line is connected with the data driver 112, and the data signal corresponding to the image signal is transmitted to the data line from the data driver 112.

The second glass base 136 is a base made of glass arranged on the front surface side of the display panel, and is formed with the opposite electrode described above. The color filter 140 as shown in FIG. 8A is arranged for every pixel on the inner surface (first glass base 134 side) of the second glass base 136.

Therefore, the display panel 108 can selectively change the array of the liquid crystal layer 138 in accordance with the scan signal and the data signal transmitted to the first glass base 134. The liquid crystal layer 138 can be formed with TN (Twisted Nematic) liquid crystal and STN (Super Twisted Nematic) liquid crystal, but is not limited thereto.

The display panel 108 can display the image corresponding to the image signal using the light (first input light/second input light) input from the backlight unit 106 by having the above configuration.

The configuration of the display unit 104 will be described with reference again to FIG. 11. The scan driver 110 selectively applies the scan signal to each scanning line. The scan driver 110 can selectively apply the scan signal to the scanning line based on a synchronization signal transmitted from the light emission control unit 114.

The data driver 112 applies the data signal corresponding to the image signal to each data line based on the image signal (first image signal/second image signal/third image signal) transmitted from the light emission control unit 114.

The light emission control unit 114 selectively transmits the first light emission signal and the second light emission signal for light emitting the first light source and the second light source to the backlight unit 106.

Figure 15:
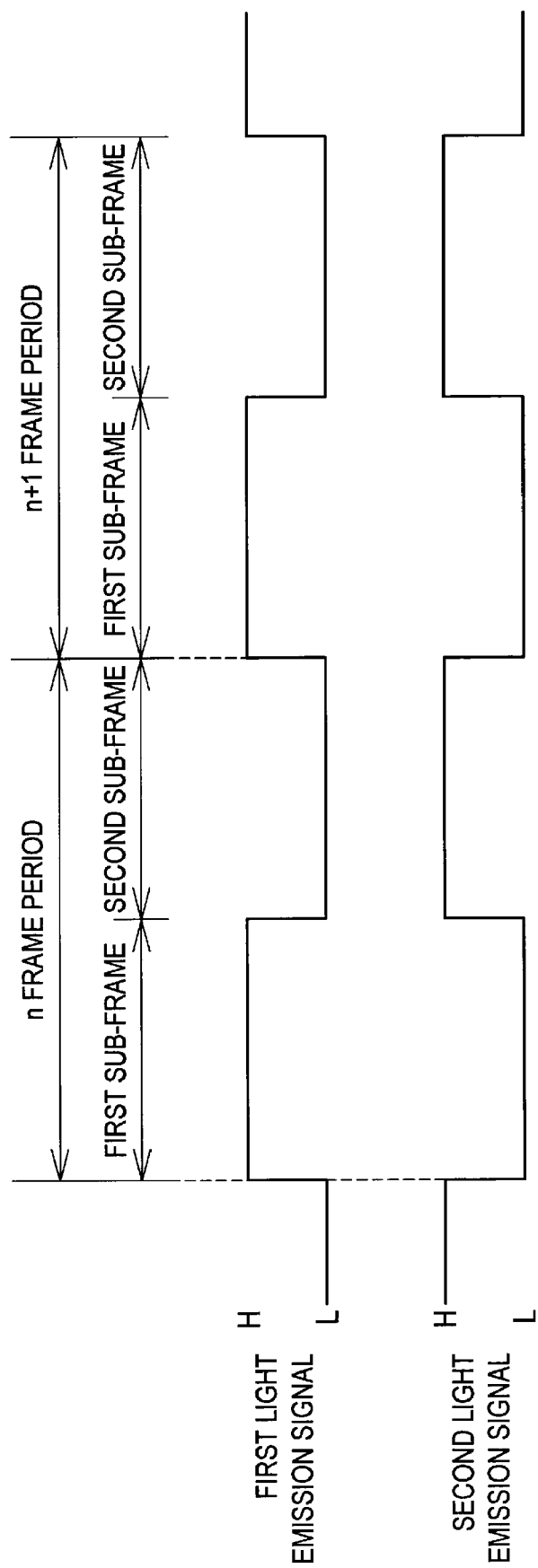
FIG. 15 is an explanatory view showing one example of a first light emission signal and a second light emission signal according to the embodiment of the present invention.

FIG. 15 is an explanatory view showing one example of the first light emission signal and the second light emission signal according to the embodiment of the present invention. The following description is made assuming that the first light source and the second light source are light emitted when the first light emission signal and the second light emission signal are high level (H shown in FIG. 15), and the first light source and the second light source are not light emitted when the signals are low level (L shown in FIG. 15). When the low level shown in FIG. 15 indicates 0 (zero), the light emission control unit 114 transmits the first light emission signal and the second light emission signal to the backlight unit 106 only if the first light emission signal and the second light emission signal are high level. It should be recognized that the light emission signal (first light emission signal, second light emission signal) for light emitting the first light source and the second light source is not limited to the above.

With reference to FIG. 15, the light emission control unit 114 transmits the first light emission signal of high level to the backlight unit 106 and does not transmit the second light emission signal of high level in the first sub-frame. In the second sub-frame, the light emission control unit 114 transmits the second light emission signal of high level to the backlight unit 106 and does not transmit the first light emission signal of high level. Therefore, in the backlight unit 106, the first light source 172 emits light in the first sub-frame, and the second light source 174 emits light in the second sub-frame.

The display device 100 can divide one frame period into two sub-frames when the light emission control unit 114 transmits the light emission signal (first light emission signal, second light emission signal), as shown in FIG. 15, to the backlight unit 106.

The light emission control unit 114 transmits the first image signal (R signal) and the third image signal (B signal) to the data driver 112 in the first sub-frame based on the image signal (first image signal/second image signal/third image signal) transmitted from the image signal processing unit 102. The light emission control unit 114 transmits the second image signal (G signal) to the data driver 112 in the second sub-frame. The light emission control unit 114 transmits the synchronization signal to the scan driver 110 in synchronization with the transmission of the image signal to the data driver 112.

According to the above configuration, the light emission control unit 114 can cause the display panel 108 to display the image corresponding to the light emitted by the light source (first light source/second light source) in each sub-frame. Therefore, the field sequential type according to the embodiment of the present invention shown in (2-2) described above is realized in the display device 100. The light emission control unit 114 can transmit various signals in synchronization to each of the backlight unit 106, the scan driver 110, and the data driver 112 by including a timing controller and the like, but is not limited thereto.

The display device 100 can achieve elimination of the feedback system for light emission control and higher image quality by including the display unit 104 of the above configuration.

The display device 100 according to the embodiment of the present invention includes two types of light sources, the first light source and the second light source, as described above. Either the first light source or the second light source is configured by the green light emitting diode that emits the G light, and the other light source is configured by the blue light emitting diode that emits the B light. The R light is realized by arranging the phosphor of R in either the first light source or the second light source. Since the green light emitting diode and the blue light emitting diode have similar characteristics, the display device 100 can prevent off-balance of the light emitted by the light source that may occur from operation temperature and change over time by using such light emitting diodes for the light source. That is, in the display device 100, light emission control is not performed by feedback as in the display device of the related art. Therefore, the display device 100 can achieve elimination of the feedback system for light emission control. Furthermore, when the display device 100 is applied to a portable device (so-called mobile device), the display device 100 contributes to further miniaturization and lighter weight of the portable device.

The display device 100 displays the image corresponding to the input image signal on the display panel by using both the color filter type shown in (2-1) and the field sequential type shown in (2-2) described above. Here, the display device 100 includes the first color filter for transmitting the light of two colors of the light of the three primary colors of RGB and a second color filter for transmitting the light of two colors of the light of the three primary colors, the transmitting color being different from that of the first color filter, for every pixel <Color filter type>. The display device 100 divides one frame period into two sub-frames by selectively light emitting the first light source and the second light source within one frame period. The display device 100 displays the image of the color corresponding to the light (first input light) emitted by the first light source or the image of the color corresponding to the light (second input light) emitted by the second light source for every sub-frame in synchronization with the light emission of the first light source and the second light source <Field sequential type>. The display device 100 can more efficiently use the light emitted from the light source for every sub-frame than the display device of the related art using the color filter type of the related art by using both the color filter type and the field sequential type. Furthermore, the display device 100 can further enhance the brightness felt by the user than the display device using the color filter type of the related art by using both the color filter type and the field sequential type. Therefore, the display device 100 can achieve higher image quality than the display device using the color filter type of the related art.

The field sequential type according to the embodiment of the present invention can lower the field frequency to about ⅔ than the field sequential type of the related art. Therefore, the display device 100 can more easily realize the field sequential type according to the embodiment of the present invention than the field sequential type of the related art.

Therefore, the display device 100 can achieve elimination of the feedback system for light emission control and higher image quality (in the non-light emitting display device having separate light source).

The display device 100 has been described above as an embodiment of the present invention, but the embodiment of the present invention is not limited to such mode. The embodiment of the present invention may be applied to various electronic devices such as a computer including UMPC (Ultra Mobile Personal Computer) and PDA (Personal Digital Assistant), a portable communication device such as portable telephone and PHS (Personal Handyphone System), an image/music reproducing device such as WALK MAN (registered trademark), a portable game machine such as PlayStation Portable (registered trademark), and a non-light emitting display device having separate light source such as LCD and DMD.

Display Method According to Embodiment of Present Invention

Figure 16:
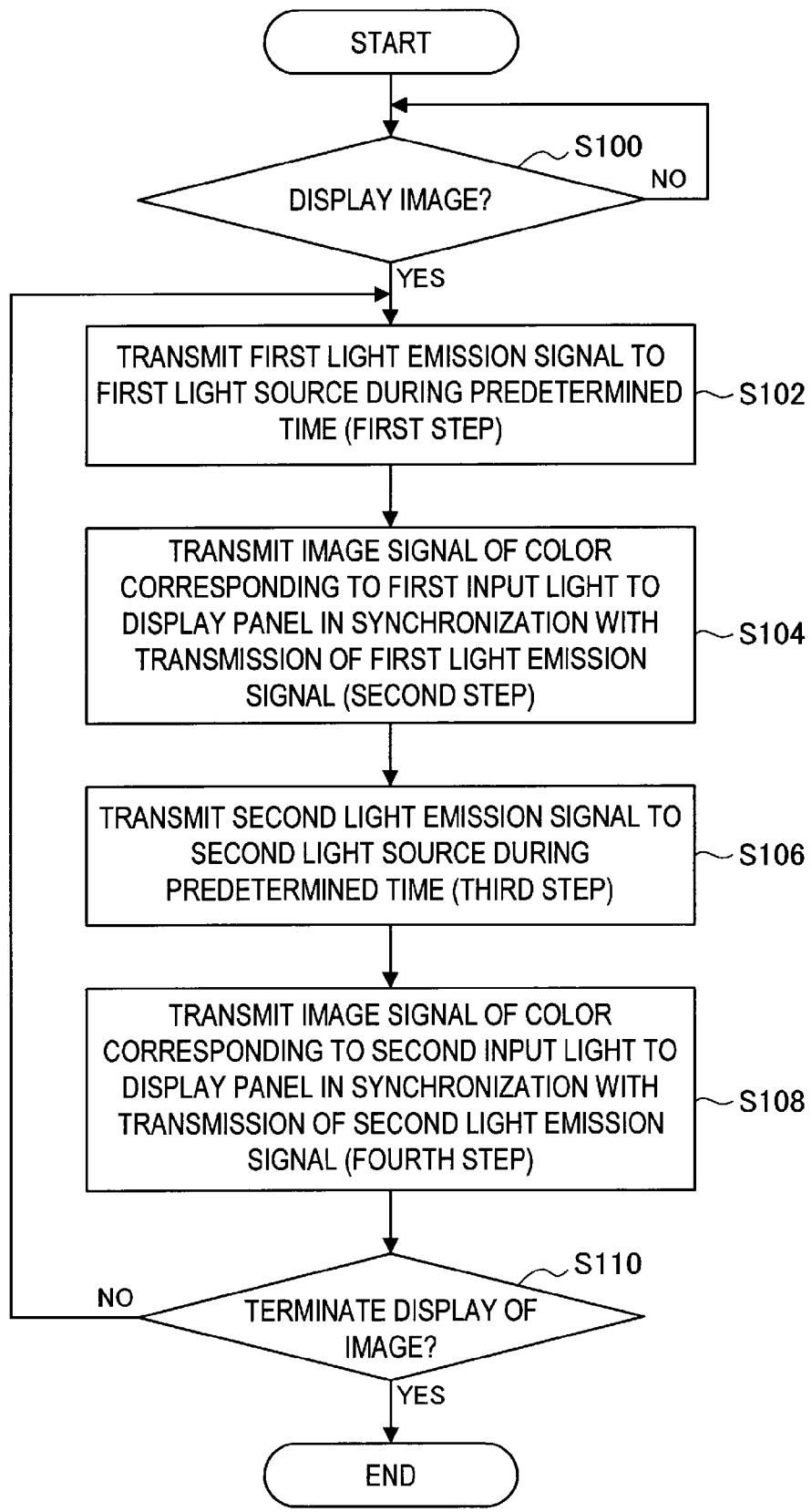
FIG. 16 is a flowchart showing one example of the display method according to the embodiment of the present invention.

The display method according to the embodiment of the present invention that can be applied to the display device 100 according to the embodiment of the present invention will now be described. In other words, the display method described below is based on the assumption that the display device 100 includes two types of light sources of the first light source and the second light source, and a display panel including a first color filter and a second color filter for every pixel. FIG. 16 is a flowchart showing one example of the display method according to the embodiment of the present invention.

The display device 100 determines whether or not to display an image (S100). The display device 100 can make the determination of step S100 based on whether or not the image signal is input, whether or not a predetermined operation signal based on the user operation is transmitted from the operation unit (not shown), and the like.

If determined not to display the image in step SI 00, the display device 100 does not proceed the process.

If determined to display the image in step S100, the display device 100 transmits the first light emission signal to the first light source during a predetermined time (S102; first step). The first light emission signal is a control signal for light emitting the first light source. The display device 100 light emits the first light source by transmitting the first light emission signal of high level to the first light source as shown in FIG. 15, but is not limited thereto. The predetermined time may be a time corresponding to ½ of one frame period, but is not limited thereto. For instance, the display device 100 may transmit the first light emission signal to the first light source during a predetermined time satisfying a relationship "(one frame period)>(predetermined time in step S102)". The display device 100 can generate a first sub-frame by transmitting the first light emission signal to the first light source during the predetermined time within one frame period.

The display device 100 transmits the image signal (first image signal/second image signal/third image signal) of the color corresponding to the light (first input light) emitted by the first light source to the display panel in synchronization with the transmission of the first light emission signal in step S102 (S 104; second step). The image signal (first image signal/second image signal/third image signal) may be that generated by the image signal processing unit 102 arranged in the display device 100, or may be that input to the display device 100.

After the transmission of the first light emission signal in step S102 and the transmission of the image signal in step S104 are completed, the display device 100 transmits the second light emission signal to the second light source during a predetermined time (S106; third step). The second light emission signal is a control signal for light emitting the second light source. The display device 100 light emits the second light source by transmitting the second light emission signal of high level to the second light source as shown in FIG. 15, but is not limited thereto. The predetermined time may be a time corresponding to ½ of one frame period, similar to step S102, but is not limited thereto. For instance, the display device 100 may have the remaining time obtained by subtracting the predetermined time in step S102 from one frame period as the predetermined time in step S104. The display device 100 can generate a second sub-frame by transmitting the second light emission signal to the second light source during the predetermined time within one frame period.

The display device 100 transmits the image signal (first image signal/second image signal/third image signal) of the color corresponding to the light (second input light) emitted by the second light source to the display panel in synchronization with the transmission of the second light emission signal in step S106 (S108; fourth step).

Through the processes of step S102 to step S108, the display device 100 divides one frame period into two sub-frames, and displays the corresponding image on the display panel in each sub-frame.

After the transmission of the second light emission signal in step S106 and the transmission of the image signal in step S108 are completed, the display device 100 determines whether or not to terminate the display of the image (S110). The display device 100 can make the determination of step S110 based on whether or not the image signal is input, whether or not a predetermined operation signal based on the user operation is transmitted from the operation unit (not shown), and the like, similar to step S100.

If determined not to terminate the display of the image in step S110, the display device 100 repeats the processes from step S102. Therefore, in the above case, the display device 100 continues to display the image on the display screen (display panel). Furthermore, if determined to terminate the display of the image in step S110, the display device 100 terminates the display of the image.

The display device 100 can realize both the color filter type shown in (2-1) and the field sequential type shown in (2-2) described above by using the display method shown in FIG. 16. Furthermore, the display device 100 using the display method shown in FIG. 16 includes a first light source and a second light source, one of which is configured by a green light emitting diode that emits the G light and the other is configured by a blue light emitting diode that emits the B light. Therefore, the display device 100 can achieve the elimination of the feedback system for light emission control and higher image quality (in the non-light emitting display device having separate light source) by using the display method shown in FIG. 16.

[Program According to Embodiment of Present Invention]

The display method according to the embodiment of the present invention described above can be realized by a program. Therefore, the elimination of the feedback system for light emission control and higher image quality (in the non-light emitting display device having separate light source) can be achieved by the program (program for realizing the display method described above) for causing the computer to function as the display device 100 according to the embodiment of the present invention.

The present application contains subject matter related to that disclosed in Japanese Priority Patent Application JP 2008-192330 filed in the Japan Patent Office on Jul. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For instance, provision of the program (computer program) for causing the computer to function as the display device 100 according to the embodiment of the present invention has been shown above, but the embodiment of the present invention can further provide a storage medium stored with the program.

The configuration described above shows one example of the embodiment of the present invention, and obviously belongs to the technical scope of the present invention.

What is claimed is:

1. A display device comprising:
a display panel including, for every pixel, (i) a first color filter configured to transmit light of two colors out of three primary colors of red, green and blue, and (ii) a second color filter configured to transmit light of two colors out of the three primary colors, one of the colors of light transmittable through the second color filter being different from the two colors of light transmittable through the first color filter, and the display panel configured to display an image based on image signals corresponding respectively to the three primary colors;
a light source unit that has a first light emitting unit and a second light emitting unit that are configured such that (i) the first light emitting unit includes either a green light emitting diode that emits green light or a blue light emitting diode that emits blue light and (ii) the second light emitting unit includes either a green light emitting diode that emits green light or a blue light emitting diode that emits blue light, the light emitting diode arranged in the second light emitting unit being of a different color than that arranged in the first light emitting unit, and (iii) either the first light emitting unit or the second light emitting unit further includes a red phosphor arranged together with the green light emitting diode or the blue light emitting diode such that the same light emitting unit emits green or blue light and also emits red light, the light emitting unit that includes the red phosphor being configured to input light of two colors out of the three primary colors as a first input light to the display panel in response to a first light emitting signal, and the other light transmitting unit being configured to input light of one color out of the three primary colors as a second input light to the display panel in response to a second light emitting signal, the second input light being different from the first input light;
a light emitting control unit configured to selectively (i) output the first light emitting signal for a first respective one of the light emitting units to emit light, (ii) output the second light emitting signal for a second respective one of the light emitting units to emit light, (iii) output image signals of the two colors corresponding to the first input light, and (iv) output an image signal of the one color corresponding to the second input light,
wherein,
the light emitting control unit divides one frame period into two sub-frames,
an output of the first light emitting signal to the first respective one of the light emitting units and an output of the image signals of the two colors corresponding to the first input light to the display panel are performed in synchronization in one of the two sub-frames, and
an output of the second light emitting signal to the second respective one of the light emitting units and an output of the image signal of the one color corresponding to the second input light to the display panel are performed in synchronization in another one of the two sub-frames.

2. The display device according to claim 1, wherein the first color filter and the second color filter are configured such that one color filter is a cyan filter that transmits blue light and green light and the other color filter is a yellow filter that transmits red light and green light.

3. The display device according to claim 1, further comprising:
an image signal processing unit configured to generate the image signals corresponding respectively to the three primary colors based on an input image signal, the image signals being a first image signal corresponding to a first color of the three primary colors, a second image signal corresponding to a second color of the three primary colors, and a third image signal corresponding to a third color of the three primary colors,
wherein the light emitting control unit receives the first image signal, the second image signal, and the third image signal generated by the image signal processing unit.

4. A display method comprising:
transmitting to a light source unit a first light emitting signal for inputting to a display panel light of two colors out of three primary colors of red, green, and blue as a first input light, the first input light being input to the display panel in one of two sub-frames obtained by dividing one frame period into the two sub-frames;
transmitting image signals of the two colors corresponding to the first input light to the display panel in synchronization with the transmission of the first light emitting signal;
transmitting to the light source unit a second light emitting signal for inputting to the display panel light of one color out of the three primary colors as a second input light, the second input light being different from the first input light, the second input light being input to the display panel in another one of the two sub-frames; and
transmitting an image signal of the one color corresponding to the second input light to the display panel in synchronization with the transmission of the second light emitting signal,
wherein,
the display panel includes, for every pixel, (i) a first color filter configured to transmit light of two colors out of three primary colors of red, green and blue, and (ii) a second color filter configured to transmit light of two colors out of the three primary colors, one of the colors of light transmittable through the second color filter being different from the two colors of light transmittable through the first color filter, and the display panel configured to display an image based on image signals corresponding respectively to the three primary colors,
the light source unit has a first light emitting unit and a second light emitting unit, and in the light source unit, (i) the first light emitting unit includes either a green light emitting diode that emits green light or a blue light emitting diode that emits blue light and (ii) the second light emitting unit includes either a green light emitting diode that emits green light or a blue light emitting diode that emits blue light, the light emitting diode arranged in the second light emitting unit being of a different color than that arranged in the first light emitting unit, and (iii) either the first light emitting unit or the second light emitting unit further includes a red phosphor arranged together with the green light emitting diode or the blue light emitting diode such that the same light emitting unit emits green or blue light and also emits red light, the light emitting unit that includes the red phosphor being configured to input the first input light to the display panel in response to the transmitted first light emitting signal and the other light transmitting unit being configured to input the second input light to the display panel in response to the transmitted second light emitting signal.

5. An electronic device comprising:
an image signal processing unit configured to generate a first image signal corresponding to a first color of three primary colors of red, green, and blue, a second image signal corresponding to a second color of the three primary colors, and a third image signal corresponding to a third color of the three primary colors based on an input image signal; and
a display unit configured to display an image based on the first image signal, the second image signal, and the third image signal generated in the image signal processing unit,
wherein the display unit includes
(i) a display panel including, for every pixel, (a) a first color filter configured to transmit light of two colors out of the three primary colors, and (a) a second color filter configured to transmit light of two colors out of the three primary colors, one of the colors of light transmittable through the second color filter being different from the two colors of light transmittable through the first color filter;
(ii) a light source unit that has a first light emitting unit and a second light emitting unit that are configured such that (a) the first light emitting unit includes either a green light emitting diode that emits green light or a blue light emitting diode that emits blue light and (b) the second light emitting unit includes either a green light emitting diode that emits green light or a blue light emitting diode that emits blue light, the light emitting diode arranged in the second light emitting unit being of a different color than that arranged in the first light emitting unit, and (c) either the first light emitting unit or the second light emitting unit further includes a red phosphor arranged together with the green light emitting diode or the blue light emitting diode such that the same light emitting unit emits green or blue light and also emits red light, the light emitting unit that includes the red phosphor being configured to input light of two colors out of the three primary colors as a first input light to the display panel in response to a first light emitting signal, and the other light transmitting unit being configured to input light of one color out of the three primary colors as a second input light to the display panel in response to a second light emitting signal, the second input light being different from the first input light,
(iii) a light emitting control unit configured to selectively (a) output the first light emitting signal for a first respective one of the light emitting units to emit light, (b) output the second light emitting signal for a second respective one of the light emitting units to emit light, (c) output image signals from the first, second, and third image signals generated by the image signal processing unit of the two colors corresponding to the first input light, and (d) output an image signal from the first, second, and third image signals generated by the image signal processing unit of the one color corresponding to the second input light, wherein, the light emitting control unit divides one frame period into two sub-frames, an output of the first light emitting signal to the first respective one of the light emitting units and an output of the image signals of the two colors corresponding to the first input light to the display panel are performed in synchronization in one of the two sub-frames, and an output of the second light emitting signal to the second respective one of the light emitting units and an output of the image signal of the one color corresponding to the second input light to the display panel are performed in synchronization in another one of the two sub-frames.

* * * * *